US012789461B2

(12) United States Patent
Pendurti et al.

(10) Patent No.: US 12,789,461 B2
(45) Date of Patent: Nov. 10, 2026

(54) ADDITIVE MANUFACTURING APPARATUSES INCLUDING ENVIRONMENTAL SYSTEMS AND METHODS OF USING THE SAME

(71) Applicant: GENERAL ELECTRIC COMPANY

(72) Inventors: Srinivas Pendurti, Mason, OH (US); Carlos H. Bonilla, Lebanon, OH (US); Timothy Francis Andrews, Sharonville, OH (US); Zhen Liu, Glenville, NY (US); Cassidy C. Shibiya, Harrison, OH (US)

(73) Assignee: General Electric Company, Evendale, OH (US)

( * ) Notice: Subject to any disclaimer, the term of this patent is extended or adjusted under 35 U.S.C. 154(b) by 370 days.

(21) Appl. No.: 18/250,657

(22) PCT Filed: Oct. 27, 2021

(86) PCT No.: PCT/US2021/056789
§ 371 (c)(1),
(2) Date: Apr. 26, 2023

(87) PCT Pub. No.: WO2022/093916
PCT Pub. Date: May 5, 2022

(65) Prior Publication Data
US 2023/0398744 A1 Dec. 14, 2023

Related U.S. Application Data

(60) Provisional application No. 63/107,161, filed on Oct. 29, 2020.

(51) Int. Cl.
*B29C 64/371* (2017.01)
*B29C 64/165* (2017.01)
(Continued)

(52) U.S. Cl.
CPC .......... *B29C 64/371* (2017.08); *B29C 64/165* (2017.08); *B33Y 30/00* (2014.12); *B33Y 40/00* (2014.12)

(58) Field of Classification Search
CPC ..... B29C 64/371; B29C 64/165; B33Y 30/00; B33Y 40/00
See application file for complete search history.

(56) References Cited

U.S. PATENT DOCUMENTS 4,034,219 A 7/1977 Louden et al.
4,404,566 A 9/1983 Clark et al.
(Continued)

FOREIGN PATENT DOCUMENTS

CN 201815393 U 5/2011
CN 103949636 A 7/2014
(Continued)

OTHER PUBLICATIONS

US 9,744,592 B1, 08/2017, Schmitt et al. (withdrawn)
(Continued)

*Primary Examiner* — Galen H Hauth
*Assistant Examiner* — John Robitaille
(74) *Attorney, Agent, or Firm* — Dinsmore & Shohl LLP

(57) ABSTRACT

According to various embodiments, an additive manufacturing apparatus comprises a process chamber surrounding a print head, a recoat head, and a linear motion stage to which the print head and the recoat head are coupled. The print head and recoat head operate within the process chamber to build a three-dimensional object by depositing a build material and a binder material. The additive manufacturing apparatus further comprises a condenser system fluidly coupled to the process chamber to receive a gas stream with a first vapor content from the process chamber and provide the gas stream with a second vapor content to the process
(Continued)

chamber. The second vapor content is less than the first vapor content. Additionally, the additive manufacturing apparatus comprises a blower fluidly coupled to the process chamber and the condenser to flow the gas stream through a closed loop comprising the blower, the process chamber, and the condenser.

16 Claims, 9 Drawing Sheets

(51) Int. Cl.
*B33Y 30/00* (2015.01)
*B33Y 40/00* (2020.01)

(56) References Cited

U.S. PATENT DOCUMENTS 4,680,895 A 7/1987 Roestenberg
4,722,824 A 2/1988 Wiech, Jr.
5,012,260 A 4/1991 Yoshimura et al.
5,204,055 A 4/1993 Sachs et al.
5,387,380 A 2/1995 Cima et al.
6,007,318 A 12/1999 Russell et al.
6,092,887 A 7/2000 Tanino et al.
6,159,085 A 12/2000 Hara
6,375,874 B1 4/2002 Russell et al.
6,454,811 B1 9/2002 Sherwood et al.
6,607,572 B2 8/2003 Gammack et al.
6,657,155 B2 12/2003 Abe et al.
6,764,636 B1 7/2004 Allanic et al.
6,824,714 B1 11/2004 Turck et al.
6,835,222 B2 12/2004 Gammack
6,945,638 B2 9/2005 Teung et al.
6,989,115 B2 1/2006 Russell et al.
7,034,246 B2 4/2006 Muylaert et al.
7,037,382 B2 5/2006 Davidson et al.
7,204,684 B2 4/2007 Ederer et al.
7,225,803 B2 6/2007 Boyadjieff
7,281,785 B2 10/2007 Palifka et al.
7,291,002 B2 11/2007 Russell et al.
7,296,990 B2 11/2007 Devos et al.
7,357,629 B2 4/2008 Weiskopf et al.
7,387,359 B2 6/2008 Hernandez et al.
7,389,154 B2 6/2008 Hunter et al.
7,435,368 B2 10/2008 Davidson et al.
7,585,450 B2 9/2009 Wahlstrom et al.
7,686,995 B2 3/2010 Davidson et al.
7,690,909 B2 4/2010 Wahlstrom
7,820,241 B2 10/2010 Perret et al.
7,824,001 B2 11/2010 Fienup et al.
7,850,271 B2 12/2010 Gothait et al.
7,879,123 B2 2/2011 Lundquist et al.
7,971,991 B2 7/2011 Davidson et al.
7,979,152 B2 7/2011 Davidson
8,017,055 B2 9/2011 Davidson et al.
8,033,812 B2 10/2011 Collins et al.
8,105,527 B2 1/2012 Wahlstrom
8,167,395 B2 5/2012 Fienup et al.
8,185,229 B2 5/2012 Davidson
8,322,821 B2 12/2012 Tsai et al.
8,951,033 B2 2/2015 Hchsmann et al.
8,956,144 B2 2/2015 Grasegger et al.
8,997,799 B2 4/2015 Hodson et al.
9,027,378 B2 5/2015 Crump et al.
9,346,127 B2 5/2016 Buller et al.
9,403,235 B2 8/2016 Buller et al.
9,446,448 B2 9/2016 Mccoy et al.
9,586,290 B2 3/2017 Buller et al.
9,636,870 B2 5/2017 Kuzusako et al.
9,912,915 B2 3/2018 Sinclair
9,919,474 B2 3/2018 Napadensky
9,989,396 B2 6/2018 Gold et al.
10,022,794 B1 7/2018 Redding et al.
10,093,103 B2 10/2018 Araki et al.
10,166,603 B2 1/2019 Kawada et al.
10,183,330 B2 1/2019 Buller et al.
10,189,267 B2 1/2019 Sakai et al.
10,195,693 B2 2/2019 Buller et al.
10,232,443 B2 3/2019 Myerberg et al.
10,259,044 B2 4/2019 Buller et al.
10,272,492 B2 4/2019 Gibson et al.
10,272,525 B1 4/2019 Buller et al.
10,286,452 B2 5/2019 Buller et al.
10,286,571 B2 5/2019 Hchsmann et al.
10,336,053 B2 7/2019 Sasaki
10,343,725 B2 7/2019 Martin et al.
10,350,682 B2 7/2019 Myerberg et al.
10,406,262 B2 9/2019 Bonassar et al.
10,414,089 B2 9/2019 Maier
10,449,696 B2 10/2019 Elgar et al.
10,486,361 B2 11/2019 Kawabata
10,486,363 B2 11/2019 Sachs et al.
10,569,331 B2 2/2020 Kawada et al.
10,632,675 B2 4/2020 Chanclon et al.
10,695,981 B2 6/2020 Hchsmann et al.
11,167,454 B2 11/2021 Rockstroh et al.
2002/0043055 A1 4/2002 Conrad
2002/0079601 A1 6/2002 Russell et al.
2002/0116907 A1* 8/2002 Gammack ............ A47L 9/1641 15/353
2004/0194250 A1 10/2004 Conrad et al.
2006/0219163 A1 10/2006 Merot et al.
2006/0221127 A1 10/2006 Lee et al.
2007/0077323 A1 4/2007 Stonesmith et al.
2008/0111271 A1 5/2008 Khoshnevis
2008/0117240 A1 5/2008 Sheinman
2008/0200104 A1 8/2008 Chuang
2008/0284819 A1 11/2008 Owaki et al.
2008/0303882 A1 12/2008 Silverbrook et al.
2008/0303883 A1 12/2008 Miyazawa
2010/0043698 A1 2/2010 Bolt
2011/0265893 A1 11/2011 Scott et al.
2012/0018032 A1 1/2012 Von Essen
2013/0004607 A1 1/2013 Hoechsmann et al.
2014/0240396 A1 8/2014 Rosati et al.
2015/0110911 A1* 4/2015 Snyder ................. B29C 64/321 95/12
2015/0298394 A1 10/2015 Sheinman
2015/0343533 A1 12/2015 Park et al.
2016/0052054 A1 2/2016 Orange et al.
2016/0096360 A1 4/2016 Zetzl et al.
2016/0114533 A1 4/2016 Grasegger et al.
2016/0151973 A1 6/2016 Juan Jover et al.
2016/0339640 A1 11/2016 Juan et al.
2016/0361874 A1 12/2016 Park et al.
2016/0368054 A1 12/2016 Ng et al.
2017/0050378 A1 2/2017 Ederer et al.
2017/0106443 A1 4/2017 Karlsson
2017/0106595 A1 4/2017 Gnther et al.
2017/0120521 A1 5/2017 Sakura et al.
2017/0144374 A1 5/2017 Ono
2017/0182717 A1 6/2017 Byun et al.
2017/0203514 A1 7/2017 McCoy et al.
2017/0217104 A1 8/2017 Cortes I Herms et al.
2017/0239725 A1 8/2017 Ufton
2017/0246808 A1 8/2017 Hchsmann et al.
2017/0252975 A1 9/2017 Park
2017/0266880 A1 9/2017 Matsubara
2017/0304945 A1* 10/2017 Sutcliffe ................ B33Y 50/02
2017/0334138 A1 11/2017 Vilajosana et al.
2017/0334144 A1 11/2017 Fish et al.
2018/0001567 A1 1/2018 Juan et al.
2018/0009110 A1 1/2018 Langford et al.
2018/0043614 A1* 2/2018 Greenfield ............ B29C 64/153
2018/0056582 A1 3/2018 Matusik et al.
2018/0111194 A1 4/2018 Buller et al.
2018/0111196 A1 4/2018 Brezoczky et al.
2018/0236504 A1 8/2018 Pourcher et al.
2018/0244034 A1* 8/2018 Sutcliffe ............... B29C 64/255
2018/0297283 A1 10/2018 Hagedorn et al.
2018/0304364 A1 10/2018 Myerberg et al.
2018/0339467 A1 11/2018 Donovan et al.
2018/0345541 A1 12/2018 Cuyt et al.

(56) References Cited

U.S. PATENT DOCUMENTS

| | | | |
|---|---|---|---|
| 2019/0001413 | A1 | 1/2019 | Golz et al. |
| 2019/0070779 | A1 | 3/2019 | Chen et al. |
| 2019/0084231 | A1 | 3/2019 | Chanclon Fernandez et al. |
| 2019/0134705 | A1 | 5/2019 | Sheinman et al. |
| 2019/0152148 | A1 | 5/2019 | Kremer |
| 2019/0160733 | A1 | 5/2019 | Mirkin et al. |
| 2019/0201982 | A1 | 7/2019 | Lombardo et al. |
| 2019/0210277 | A1 | 7/2019 | Sachs et al. |
| 2019/0210282 | A1 | 7/2019 | Sugiura et al. |
| 2019/0217385 | A1 | 7/2019 | Bonilla Gonzalez et al. |
| 2019/0218501 | A1 | 7/2019 | Kamen et al. |
| 2019/0240732 | A1 | 8/2019 | Koch et al. |
| 2019/0358901 | A1* | 11/2019 | Dugan .................. B29C 64/153 |
| 2019/0366626 | A1 | 12/2019 | Swartz et al. |
| 2020/0147885 | A1 | 5/2020 | Gimenez Manent et al. |
| 2020/0282461 | A1 | 9/2020 | Fang |
| 2020/0298474 | A1 | 9/2020 | Gimenez et al. |
| 2020/0324467 | A1 | 10/2020 | Tjellesen et al. |

FOREIGN PATENT DOCUMENTS

| | | | |
|---|---|---|---|
| CN | 103862045 | B | 1/2017 |
| CN | 106738907 | A | 5/2017 |
| CN | 206528076 | U | 9/2017 |
| CN | 109011970 | A | 12/2018 |
| CN | 109055207 | A | 12/2018 |
| CN | 109366982 | A | 2/2019 |
| CN | 208745355 | U | 4/2019 |
| CN | 109732916 | A | 5/2019 |
| CN | 109760312 | A | 5/2019 |
| CN | 110076991 | A | 8/2019 |
| CN | 209851598 | U | 12/2019 |
| CN | 210211384 | U | 3/2020 |
| CN | 210880916 | U | 6/2020 |
| DE | 19743804 | A1 | 4/1999 |
| DE | 19846478 | A1 | 4/2000 |
| DE | 102009036153 | A1 | 2/2011 |
| DE | 202013009787 | U1 | 12/2013 |
| EP | 1704989 | A2 | 9/2006 |
| EP | 1847370 | A2 | 10/2007 |
| EP | 1776910 | B1 | 4/2013 |
| EP | 2782743 | A1 | 10/2014 |
| EP | 2091718 | B1 | 8/2016 |
| EP | 2986405 | B1 | 2/2017 |
| EP | 3456518 | A1 | 3/2019 |
| EP | 3461574 | A1 | 4/2019 |
| EP | 3475057 | A1 | 5/2019 |
| EP | 3492244 | A1 | 6/2019 |
| EP | 3511094 | A1 | 7/2019 |
| EP | 3560714 | A1 | 10/2019 |
| EP | 3566869 | A2 | 11/2019 |
| EP | 3463817 | B1 | 4/2021 |
| EP | 3575064 | B1 | 8/2021 |
| GB | 2550339 | A | 11/2017 |
| JP | 2001507295 | A | 6/2001 |
| JP | 2002292751 | A | 10/2002 |
| JP | 2006511365 | A | 4/2006 |
| JP | 2006183928 | A | 7/2006 |
| JP | 2009136758 | A | 6/2009 |
| JP | 2010149318 | A | 7/2010 |
| JP | 2012501828 | A | 1/2012 |
| JP | 2013139989 | A | 7/2013 |
| JP | 2013193222 | A | 9/2013 |
| JP | 2015522438 | A | 8/2015 |
| JP | 2016539833 | A | 12/2016 |
| JP | 2018001414 | A | 1/2018 |
| JP | 2018047562 | A | 3/2018 |
| JP | 2018144037 | A | 9/2018 |
| JP | 2020501018 | A | 1/2020 |
| JP | 2020093259 | A | 6/2020 |
| WO | 1998028124 | A2 | 7/1998 |
| WO | 2010055751 | A1 | 5/2010 |
| WO | 2011005690 | A1 | 1/2011 |
| WO | 2013182913 | A2 | 12/2013 |
| WO | 2014006877 | A1 | 1/2014 |
| WO | 2014044676 | A1 | 3/2014 |
| WO | 2014096177 | A1 | 6/2014 |
| WO | 2015112885 | A1 | 7/2015 |
| WO | 2015141779 | A1 | 9/2015 |
| WO | 2016040453 | A1 | 3/2016 |
| WO | 2016055523 | A1 | 4/2016 |
| WO | 2016083234 | A1 | 6/2016 |
| WO | 2017017272 | A1 | 2/2017 |
| WO | 2017088897 | A1 | 6/2017 |
| WO | 2017152142 | A1 | 9/2017 |
| WO | 2017180314 | A1 | 10/2017 |
| WO | 2018017117 | A1 | 1/2018 |
| WO | 2018149544 | A1 | 8/2018 |
| WO | 2018181334 | A1 | 10/2018 |
| WO | 2018183396 | A1 | 10/2018 |
| WO | 2018191667 | A1 | 10/2018 |
| WO | 2018194446 | A1 | 10/2018 |
| WO | 2018194685 | A1 | 10/2018 |
| WO | 2018197888 | A1 | 11/2018 |
| WO | 2019063741 | A1 | 4/2019 |
| WO | 2019076705 | A1 | 4/2019 |
| WO | 2019089497 | A1 | 5/2019 |
| WO | 2019094269 | A1 | 5/2019 |
| WO | 2019094283 | A1 | 5/2019 |
| WO | 2019094367 | A1 | 5/2019 |
| WO | 2019113412 | A1 | 6/2019 |
| WO | 2019136222 | A1 | 7/2019 |
| WO | 2019139742 | A1 | 7/2019 |
| WO | 2019140000 | A1 | 7/2019 |
| WO | 2019157074 | A2 | 8/2019 |
| WO | 2019175556 | A1 | 9/2019 |
| WO | 2019182618 | A1 | 9/2019 |
| WO | 2019194826 | A1 | 10/2019 |
| WO | 2019209881 | A1 | 10/2019 |
| WO | 2019236074 | A1 | 12/2019 |
| WO | 2020007891 | A1 | 1/2020 |
| WO | 2020013828 | A1 | 1/2020 |
| WO | 2020068101 | A1 | 4/2020 |
| WO | 2020115468 | A1 | 6/2020 |
| WO | 2020146416 | A2 | 7/2020 |
| WO | 2020159507 | A1 | 8/2020 |
| WO | 2020237118 | A1 | 11/2020 |
| WO | 2020237119 | A1 | 11/2020 |
| WO | 2020237120 | A1 | 11/2020 |
| WO | 2020237122 | A1 | 11/2020 |
| WO | 2020237123 | A1 | 11/2020 |
| WO | 2020237138 | A1 | 11/2020 |
| WO | 2020237142 | A1 | 11/2020 |
| WO | 2020237143 | A1 | 11/2020 |
| WO | 2020237144 | A1 | 11/2020 |
| WO | 2020237161 | A1 | 11/2020 |
| WO | 2020237163 | A1 | 11/2020 |
| WO | 2020237165 | A1 | 11/2020 |
| WO | 2020237166 | A1 | 11/2020 |
| WO | 2022086867 | A1 | 4/2022 |
| WO | 2022086868 | A1 | 4/2022 |
| WO | 2022087043 | A1 | 4/2022 |
| WO | 2022087044 | A1 | 4/2022 |
| WO | 2022087046 | A1 | 4/2022 |
| WO | 2022087048 | A1 | 4/2022 |

OTHER PUBLICATIONS

Japanese Patent Office Action for Application No. 2023-526446 dated Oct. 1, 2024 (4 pages with English translation).

Japanese Patent Office Action for Application No. 2023-526446 dated May 14, 2024 (9 pages with English Translation).

International Search Report for Appln. No. PCT/US2021/055457 mailed Jan. 27, 2022, 20 pages.

International Search Report for Appln. No. PCT/US2021/055458 mailed Jan. 27, 2022, 15 pages.

International Search Report for Appln. No. PCT/US2021/055716 mailed Mar. 22, 2022, 21 pages.

International Search Report for Appln. No. PCT/US2021/055717 mailed Dec. 20, 2021, 16 pages.

International Search Report for Appln. No. PCT/US2021/055719 mailed Jan. 18, 2022, 17 pages.

(56) References Cited

OTHER PUBLICATIONS

International Search Report for Appln. No. PCT/US2021/055722 mailed Jan. 3, 2022, 14 pages.
International Search Report for Appln. No. PCT/US2021/056828 mailed Feb. 23, 2022, 11 pages.
International Search Report for Appln. No. PCT/US2021/056451 mailed Apr. 4, 2022, 33 pages.
International Search Report for Appln. No. PCT/US2021/056827 mailed Feb. 11, 2022, 15 pages.
International Search Report for Appln. No. PCT/US2021/056789 mailed Jan. 18, 2022, 18 pages.
International Search Report for Appln. No. PCT/US2021/056787 mailed Aug. 2, 2022, 12 pages.
International Search Report for Appln. No. PCT/US2021/057517 mailed Sep. 6, 2022, 21 pages.
International Preliminary Report for Appln. No. PCT/US2021/055457 mailed May 4, 2023, 14 pages.
International Preliminary Report for Appln. No. PCT/US2021/055458 mailed May 4, 2023, 10 pages.
International Preliminary Report for Appln. No. PCT/US2021/055716 mailed May 4, 2023, 16 pages.
International Preliminary Report for Appln. No. PCT/US2021/055717 mailed May 4, 2023, 11 pages.
International Preliminary Report for Appln. No. PCT/US2021/055719 mailed May 4, 2023, 12 pages.
International Preliminary Report for Appln. No. PCT/US2021/055722 mailed May 4, 2023, 10 pages.
International Preliminary Report for Appln. No. PCT/US2021/056828 mailed May 11, 2023, 8 pages.
International Preliminary Report for Appln. No. PCT/US2021/056451 mailed May 11, 2023, 23 pages.
International Preliminary Report for Appln. No. PCT/US2021/056827 mailed May 11, 2023, 9 pages.
International Preliminary Report for Appln. No. PCT/US2021/056789 mailed May 11, 2023, 11 pages.
International Preliminary Report for Appln. No. PCT/US2021/056787 mailed May 11, 2023, 8 pages.
International Preliminary Report for Appln. No. PCT/US2021/057517 mailed May 11, 2023, 15 pages.
Shanjani "Material Spreading and Compaction in Powder-Based Solid Freeform Fabrication Methods: Mathematical Modeling" Department of Mechanical and Mechatronic Engineering, University of Waterloo, Sep. 10, 2008.
Japanese Office Action for Application No. 2023-521818 dated Feb. 16, 2020 (5 pages with English Translation).
Japanese Office Action for Application No. 2023-521819 dated Feb. 20, 2024 (5 pages with English Translation).
European Patent Office Action for Application No. 21807388.0 dated Mar. 22, 2023 (8 pages).
Chinese Office Action for Application No. 202180073312.3 dated Jan. 27, 2026 (18 pages with English Translation).

* cited by examiner

ADDITIVE MANUFACTURING APPARATUSES INCLUDING ENVIRONMENTAL SYSTEMS AND METHODS OF USING THE SAME

CROSS REFERENCE TO RELATED APPLICATIONS

The present specification is a National Phase Entry of International Application No. PCT/US2021/056789 filed Oct. 27, 2021 entitled "ADDITIVE MANUFACTURING APPARATUSES INCLUDING ENVIRONMENTAL SYSTEMS AND METHODS OF USING THE SAME" which claims the benefit of U.S. Provisional Patent Application Ser. No. 63/107,161 filed Oct. 29, 2020 and entitled "Additive Manufacturing Apparatuses Including Environmental Systems and Methods of Using the Same," the entirety of which is incorporated by reference herein.

FIELD

The present specification generally relates to additive manufacturing apparatuses and methods for using the same and, more particularly, to additive manufacturing apparatuses including environmental systems and methods of using the same.

TECHNICAL BACKGROUND

Additive manufacturing apparatuses may be utilized to "build" an object from build material, such as organic or inorganic powders, in a layer-wise manner. Some build materials, such as chemically reactive powders, require an inert atmosphere for printing. Additionally, stable boundary conditions during an additive manufacturing process enable repeatable processes. For example, fluctuations in temperature, humidity, oxygen content, particle content, and pressure and flow rates within the building area can impact the quality of the object, and create dangerous situations when chemically reactive powders are used.

Accordingly, a need exists for additive manufacturing apparatuses in which the environment in the building area can be carefully controlled.

SUMMARY

A first aspect A1 includes an additive manufacturing apparatus comprising: a process chamber surrounding a print head, a recoat head, and a linear motion stage to which the print head and the recoat head are coupled, wherein the print head and recoat head operate within the process chamber to build a three-dimensional object by depositing a build material and a binder material; a condenser system fluidly coupled to the process chamber to receive a gas stream with a first vapor content from the process chamber and provide the gas stream with a second vapor content to the process chamber, wherein the second vapor content is less than the first vapor content; and a blower fluidly coupled to the process chamber and the condenser system to flow the gas stream through a closed loop comprising the blower, the process chamber, and the condenser system.

A second aspect A2 includes an additive manufacturing apparatus according to aspect A1, further comprising: a concentrator fluidly coupled to the condenser system and the process chamber.

A third aspect A3 includes an additive manufacturing apparatus according to any one of aspects A1-A2, further comprising: a volatile organic compound (VOC) sensor along a flow path of the gas stream through the closed loop.

A fourth aspect A4 includes an additive manufacturing apparatus according to any one of aspects A1-A3, further comprising: a lower explosive limit (LEL) sensor along a flow path of the gas stream through the closed loop.

A fifth aspect A5 includes an additive manufacturing apparatus according to any one of aspects A1-A4, further comprising: a particle separation system positioned within the closed loop to receive the gas stream from the process chamber and provide the gas stream to the blower, wherein the particle separation system is configured to remove particles from the gas stream.

A sixth aspect A6 includes an additive manufacturing apparatus according to aspect A5, wherein the particle separation system comprises a plurality of cyclonic separators arranged in a plurality of arrays.

A seventh aspect A7 includes an additive manufacturing apparatus according to aspect A6, wherein the plurality of cyclonic separators comprises greater than or equal to 12 cyclonic separators.

An eighth aspect A8 includes an additive manufacturing apparatus according to any one of aspects A5-A7, wherein a pressure drop over the particle separation system is less than about 1.5 psi as measured using a flow of 230 CFM of air or $N_2$ gas.

A ninth aspect A9 includes an additive manufacturing apparatus comprising: a process chamber surrounding a print head, a recoat head, and a linear motion stage to which the print head and the recoat head are coupled, wherein the print head and recoat head operate within the process chamber to build a three-dimensional object by depositing a build material and a binder material; a first plurality of sensors positioned within the process chamber, wherein the first plurality of sensors comprises at least a temperature sensor and a pressure sensor; a particle separation system fluidly coupled to the process chamber to receive a particle-laden stream from the process chamber, wherein the particle separation system separates at least some particles out from the particle-laden stream to produce a reduced-particle stream; a filter fluidly coupled to the particle separation system to receive the reduced-particle stream from the particle separation system, wherein the filter removes additional particles from the reduced-particle stream to provide a clean gas stream; a blower receiving the clean gas stream; a temperature control unit for cooling the clean gas stream; a condenser system; and a second plurality of sensors positioned external to the process chamber and after the particle separation system, the filter, the blower, the temperature control unit, and the condenser system and before the process chamber along a fluid recirculation path, wherein the second plurality of sensors comprises at least a temperature sensor, a pressure sensor, and one or more of a volatile organic compound (VOC) sensor, a lower explosive limit (LEL) sensor, a humidity sensor, and a vapor sensor; wherein the process chamber, the particle separation system, the filter, the blower, the condenser system, and the temperature control unit form a closed loop.

A tenth aspect A10 includes an additive manufacturing apparatus according to aspect A9, wherein the filter is a high efficiency particulate air (HEPA) filter.

An eleventh aspect A11 includes an additive manufacturing apparatus according to any one of aspects A9-A10, further comprising a first valve positioned between the particle separation system and the filter and a second valve positioned between the filter and the blower along the fluid recirculation path, wherein closing the first valve and the second valve fluidly isolates the filter from the closed loop.

A twelfth aspect A12 includes an additive manufacturing apparatus according to any one of aspects A9-A11, wherein the condenser system is positioned after the pump and before the process chamber along the fluid recirculation path.

A thirteenth aspect A13 includes an additive manufacturing apparatus according to any one of aspects A9-A12, wherein temperature control unit comprises a heat exchanger, and the condenser system passes the clean gas stream to the heat exchanger.

A fourteenth aspect A14 includes an additive manufacturing apparatus according to any one of aspects A9-A13, further comprising a valve to enable the condenser system to be bypassed along the fluid recirculation path.

A fifteenth aspect A15 includes an additive manufacturing apparatus according to any one of aspects A9-A14, wherein the clean gas stream comprises an inert gas.

A sixteenth aspect A16 includes an additive manufacturing apparatus according to any one of aspects A9-A15, wherein an environment within the process chamber is inert.

A seventeenth aspect A17 includes an additive manufacturing apparatus according to any one of aspects A9-A16, wherein the process chamber comprises an inlet diffuser through which the clean gas stream enters the process chamber, wherein the inlet diffuser reduces a flow velocity of the clean gas stream.

An eighteenth aspect A18 includes a method of controlling an environment within a process chamber, the method comprising: receiving, information regarding a temperature, a pressure, and a vapor content within the process chamber from at least one sensor located within the process chamber; removing a particle-laden stream from the process chamber; separating particles from the particle-laden stream to provide a clean gas stream; reducing a temperature, a vapor content, or both of the clean gas stream based on the received information to achieve a predetermined temperature, pressure, and vapor content within the process chamber; and pumping the clean gas stream into the process chamber.

A nineteenth aspect A19 includes a method according to aspect A18, wherein separating the particles from the particle-laden stream comprises directing the particle-laden stream through a particle separation system, a HEPA filter, or both.

A twentieth aspect A20 includes a method according to any one of aspects A18-19, further comprising: receiving, from a pressure sensor positioned external to the process chamber, information regarding a pressure of the clean gas stream; and identifying an error at the particle separation system, the HEPA filter, or both, based on a difference between the pressure of the clean gas stream and the pressure within the process chamber.

A twenty-first aspect A21 includes a method according to any one of aspect A18-A20, wherein the clean gas stream is substantially free of oxygen.

Additional features and advantages of the additive manufacturing apparatuses described herein, the components thereof, and methods of using the same will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
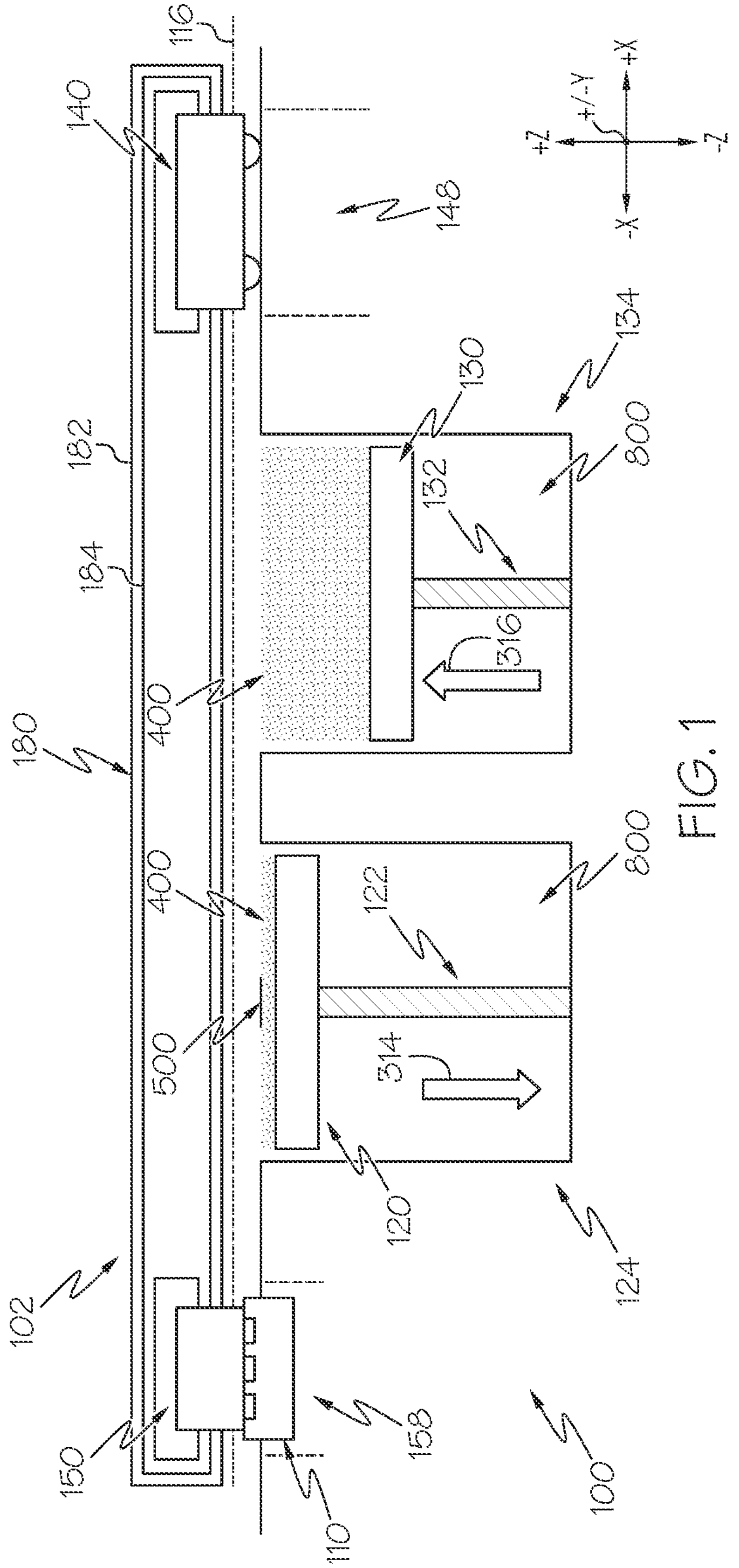
FIG. 1 schematically depicts components of an additive manufacturing apparatus according to one or more embodiments shown and described herein.

Reference will now be made in detail to embodiments of additive manufacturing apparatuses, and components thereof, examples of which are illustrated in the accompanying drawings. Whenever possible, the same reference numerals will be used throughout the drawings to refer to the same or like parts. The additive manufacturing apparatus may include a closed-loop environmental system that monitors and controls the environment within a process chamber of the additive manufacturing apparatus. The closed-loop environmental system can enable the environment within the process chamber to be converted between an inert state and a non-inert state, and maintained in the state during the building of an object and in between the building of different objects. Thus, when the environment within the process chamber is in an inert state, the additive manufacturing apparatus may use chemically reactive build material to build an object while maintaining stable boundaries. Various embodiments of additive manufacturing apparatuses and methods of using the same will be described in further detail herein with specific reference to the appended drawings.

Directional terms as used herein—for example up, down, right, left, front, back, top, bottom, upper, lower, —are made only with reference to the figures as drawn and are not intended to imply absolute orientation unless otherwise expressly stated. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

Referring now to FIG. 1, an embodiment of an additive manufacturing apparatus 100 is schematically depicted. The apparatus 100 includes a cleaning station 110, a build platform 120, and an actuator assembly 102. The apparatus 100 may optionally include a supply platform 130. The actuator assembly 102 comprises, among other elements, a recoat head 140 for distributing build material 400 and a print head 150 for depositing binder material 500. In embodiments, the recoat head 140 may further comprise an energy source for curing the binder material 500 as will be described in further detail herein. The actuator assembly 102 may be constructed to facilitate independent control of the recoat head 140 and the print head 150 along the working axis 116 of the apparatus 100. This allows for the recoat head 140 and the print head 150 to traverse the working axis 116 of the apparatus 100 in the same direction and/or in opposite directions and for the recoat head 140 and the print head 150 to traverse the working axis of the apparatus 100 at different speeds and/or the same speed. Independent actuation and control of the recoat head 140 and the print head 150, in turn, allows for at least some steps of the additive manufacturing process to be performed simultaneously thereby reducing the overall cycle time of the additive manufacturing process to less than the sum of the cycle time for each individual step. In the embodiments of the apparatus 100 described herein, the working axis 116 of the apparatus 100 is parallel to the +/−X axis of the coordinate axes depicted in the figures. It should be understood that the components of the additive manufacturing apparatus 100 traversing the working axis 116, such as the recoat head 140, the print head 150, or the like, need not be centered on the working axis 116. However, in the embodiments described herein, at least two of the components of the additive manufacturing apparatus 100 are arranged with respect to the working axis 116 such that, as the components traverse the working axis, the components could occupy the same or an overlapping volume along the working axis if not properly controlled.

In the embodiment depicted in FIG. 1, the apparatus 100 includes a cleaning station 110, a build platform 120, a supply platform 130 and an actuator assembly 102. However, it should be understood that, in other embodiments, the apparatus 100 does not include a supply platform 130, such as in embodiments where build material is supplied to the build platform 120 with, for example and without limitation, a build material hopper. In the embodiment depicted in FIG. 1, the cleaning station 110, the build platform 120, and the supply platform 130 are positioned in series along the working axis 116 of the apparatus 100 between a print home position 158 of the print head 150 located proximate an end of the working axis 116 in the −X direction, and a recoat home position 148 of the recoat head 140 located proximate an end of the working axis 116 in the +X direction. That is, the print home position 158 and the recoat home position 148 are spaced apart from one another in a horizontal direction that is parallel to the +/−X axis of the coordinate axes depicted in the figures and the cleaning station 110, the build platform 120, and the supply platform 130 are positioned therebetween. In the embodiments described herein, the build platform 120 is positioned between the cleaning station 110 and the supply platform 130 along the working axis 116 of the apparatus 100.

The cleaning station 110 is positioned proximate one end of the working axis 116 of the apparatus 100 and is co-located with the print home position 158 where the print head 150 is located or "parked" before and after depositing binder material 500 on a layer of build material 400 positioned on the build platform 120. The cleaning station 110 may include one or more cleaning sections (not shown) to facilitate cleaning the print head 150 between depositing operations. The cleaning sections may include, for example and without limitation, a soaking station containing a cleaning solution for dissolving excess binder material on the print head 150, a wiping station for removing excess binder material and excess build material from the print head 150, a jetting station for purging binder material and cleaning solution from the print head 150, a park station for maintaining moisture in the nozzles of the print head 150, or various combinations thereof. The print head 150 may be transitioned between the cleaning sections by the actuator assembly 102.

The build platform 120 is coupled to a lift system 800 comprising a build platform actuator 122 to facilitate raising and lowering the build platform 120 relative to the working axis 116 of the apparatus 100 in a vertical direction (i.e., a direction parallel to the +/−Z directions of the coordinate axes depicted in the figures). The build platform actuator 122 may be, for example and without limitation, a mechanical actuator, an electro-mechanical actuator, a pneumatic actuator, a hydraulic actuator, or any other actuator suitable for imparting linear motion to the build platform 120 in a vertical direction. Suitable actuators may include, without limitation, a worm drive actuator, a ball screw actuator, a pneumatic piston, a hydraulic piston, an electro-mechanical linear actuator, or the like. The build platform 120 and build platform actuator 122 are positioned in a build receptacle 124 located below the working axis 116 (i.e., in the −Z direction of the coordinate axes depicted in the figures) of the apparatus 100. During operation of the apparatus 100, the build platform 120 is retracted into the build receptacle 124 by action of the build platform actuator 122 after each layer of binder material 500 is deposited on the build material 400 located on build platform 120.

The supply platform 130 is coupled to a lift system 800 comprising a supply platform actuator 132 to facilitate raising and lowering the supply platform 130 relative to the working axis 116 of the apparatus 100 in a vertical direction (i.e., a direction parallel to the +/−Z directions of the coordinate axes depicted in the figures). The supply platform actuator 132 may be, for example and without limitation, a mechanical actuator, an electro-mechanical actuator, a pneumatic actuator, a hydraulic actuator, or any other actuator suitable for imparting linear motion to the supply platform 130 in a vertical direction. Suitable actuators may include, without limitation, a worm drive actuator, a ball screw actuator, a pneumatic piston, a hydraulic piston, an electro-mechanical linear actuator, or the like. The supply platform 130 and supply platform actuator 132 are positioned in a supply receptacle 134 located below the working axis 116 (i.e., in the −Z direction of the coordinate axes depicted in the figures) of the apparatus 100. During operation of the apparatus 100, the supply platform 130 is raised relative to the supply receptacle 134 and towards the working axis 116 of the apparatus 100 by action of the supply platform actuator 132 after a layer of build material 400 is distributed from the supply platform 130 to the build platform 120, as will be described in further detail herein.

Figure 2A:
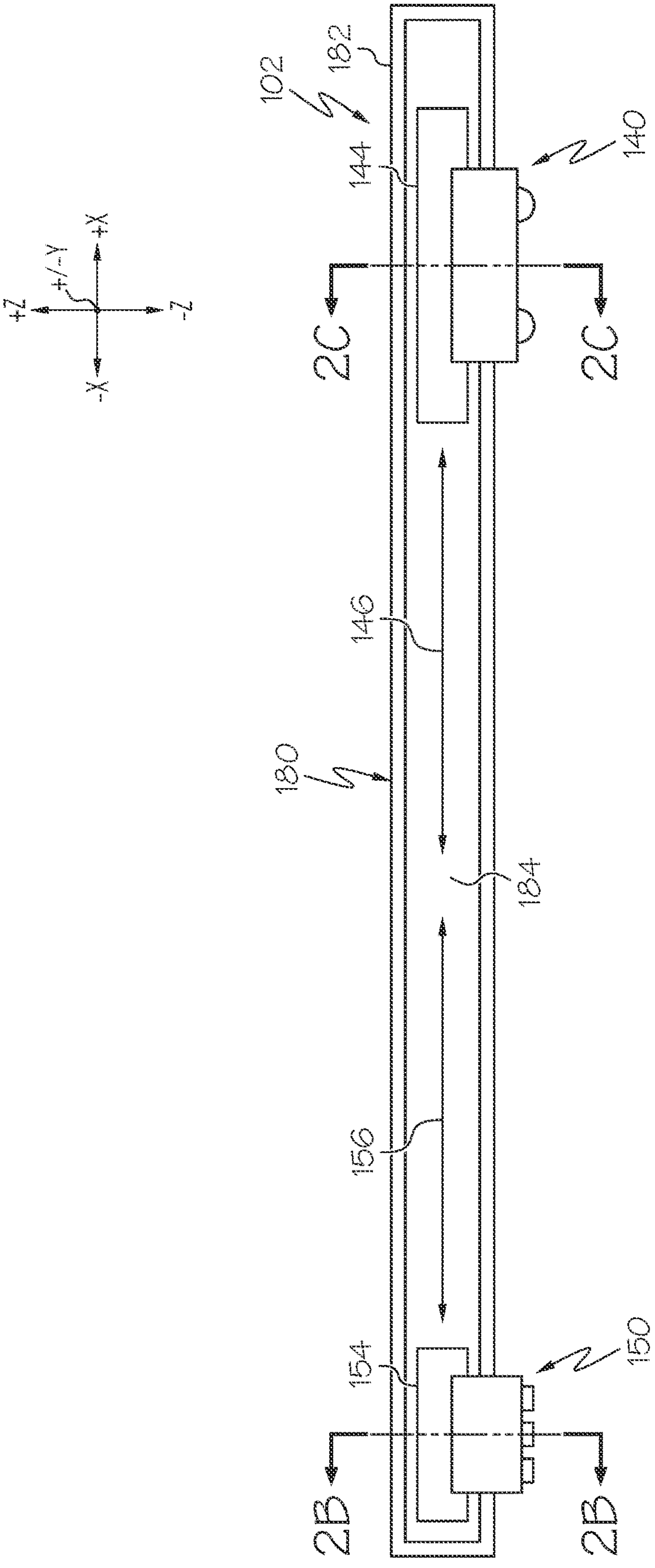
FIG. 2A schematically depicts an embodiment of an actuator assembly for an additive manufacturing apparatus according to one or more embodiments shown and described herein.

Referring now to FIGS. 1 and 2A, FIG. 2A schematically depicts the actuator assembly 102 of the additive manufacturing apparatus 100 of FIG. 1. The actuator assembly 102 generally comprises the recoat head 140, the print head 150, a recoat head actuator 144, a print head actuator 154, and a support 182. In the embodiments described herein, the support 182 extends in a horizontal direction (i.e., a direction parallel to the +/−X direction of the coordinate axes depicted in the figures) parallel to the working axis 116 (FIG. 1) of the apparatus 100. When the actuator assembly 102 is assembled over the cleaning station 110, the build platform 120, and the supply platform 130 as depicted in FIG. 1, the support 182 extends in a horizontal direction from at least the cleaning station 110 to beyond the supply platform 130.

In one embodiment, the support 182 is a side of a rail 180 that extends in a horizontal direction. For example, in one embodiment, the rail 180 may be rectangular or square in vertical cross section (i.e., a cross section in the Y-Z plane of the coordinate axes depicted in the figures) with a side surface of the rectangle or square forming the support 182. However, it should be understood that other embodiments are contemplated and possible. For example and without limitation, the rail 180 may have other cross sectional shapes, such as octagonal or the like, with the support 182 being one surface of facet of the rail 180. In embodiments, the support 182 is positioned in a vertical plane (e.g., a plane parallel to the X-Z plane of the coordinate axes depicted in the figures). However, it should be understood that, in other embodiments, the support 182 is positioned in a plane other than a vertical plane.

In the embodiments described herein, the recoat head actuator 144 and the print head actuator 154 are coupled to the support 182.

Figure 2C:
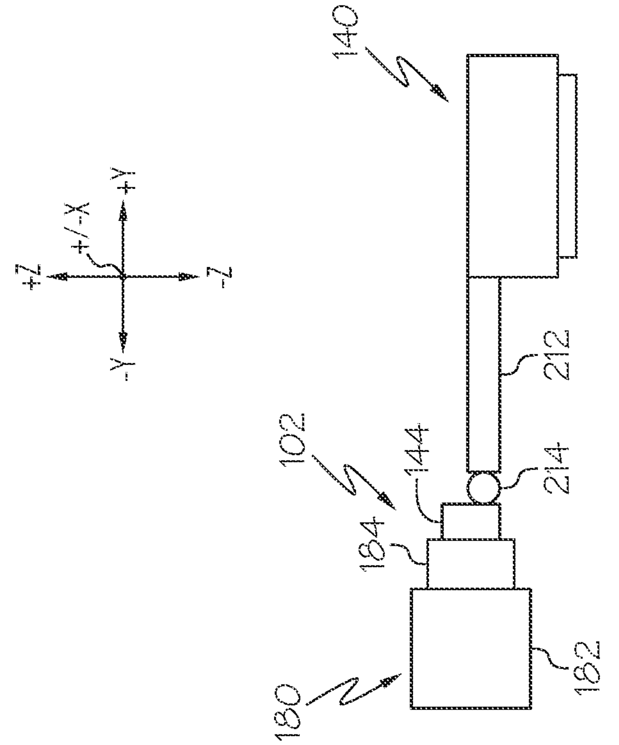
FIG. 2C schematically depicts a cross section of the actuator assembly of FIG. 2A.
Figure 2B:
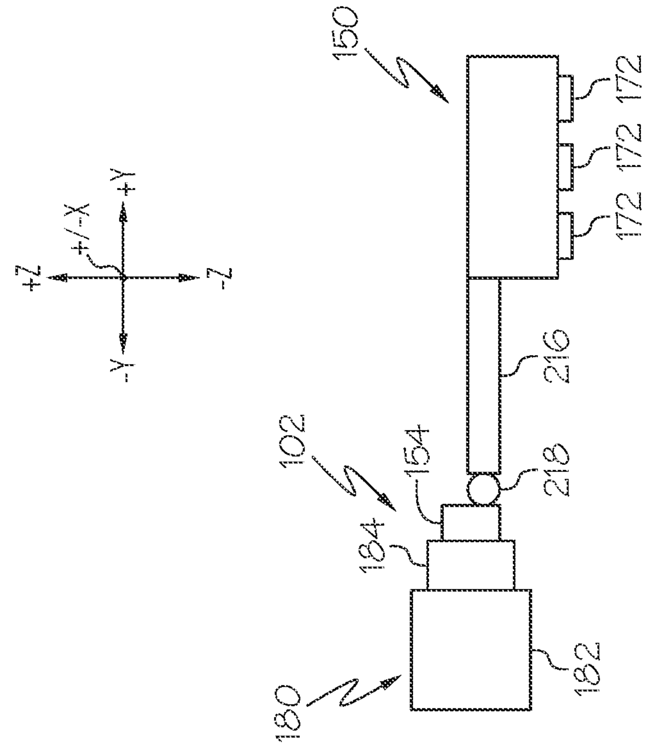
FIG. 2B schematically depicts a cross section of the actuator assembly of FIG. 2A.

In the embodiments described herein, the recoat head actuator 144 is bi-directionally actuatable along a recoat motion axis 146 and the print head actuator 154 is bi-directionally actuatable along a print motion axis 156. That is, the recoat motion axis 146 and the print motion axis 156 define the axes along which the recoat head actuator 144 and the print head actuator 154 are actuatable, respectively. In embodiments, the recoat head actuator 144 and the print head actuator 154 are bi-directionally actuatable independent of one another. The recoat motion axis 146 and the print motion axis 156 extend in a horizontal direction and are parallel with the working axis 116 (FIG. 1) of the apparatus 100. In the embodiments described herein, the recoat motion axis 146 and the print motion axis 156 are co-linear. With this configuration, the recoat head 140 and the print head 150 may occupy the same space (or portions of the same space) along the working axis 116 of the apparatus 100 at different times because the recoat motion axis 146 and the print motion axis 156 lie along the same line. In the embodiment of the actuator assembly 102 depicted in FIGS. 2A-2C, the recoat motion axis 146 and the print motion axis 156 are located in the same vertical plane. In embodiments where the support 182 is positioned in a vertical plane, the recoat motion axis 146 and the print motion axis 156 are located a vertical plane that is parallel to the vertical plane of the support 182, as depicted in FIGS. 2A-2C. However, it should be understood that other embodiments are contemplated and possible, such as embodiments in which the recoat motion axis 146 and the print motion axis 156 are located in a vertical plane that is non-parallel with the plane of the support 182.

In the embodiments described herein, the recoat head actuator 144 and the print head actuator 154 may be, for example and without limitation, mechanical actuators, electro-mechanical actuators, pneumatic actuators, hydraulic actuators, or any other actuator suitable for providing linear motion. Suitable actuators may include, without limitation, worm drive actuators, ball screw actuators, pneumatic pistons, hydraulic pistons, electro-mechanical linear actuators, or the like. In one particular embodiment, the recoat head actuator 144 and the print head actuator 154 are linear actuators manufactured by Aerotech® Inc. of Pittsburgh, Pennsylvania, such as the PRO225LM Mechanical Bearing, Linear Motor Stage.

For example, the actuator assembly 102 may comprise a guide 184 affixed to the support 182 of the rail 180. The recoat head actuator 144 and the print head actuator 154 may be moveably coupled to the rail 180 such that the recoat head actuator 144 and the print head actuator 154 can independently traverse a length of the guide 184. In embodiments, the motive force traversing the recoat head actuator 144 and the print head actuator 154 is supplied by direct-drive linear motors, such as brushless servomotors, for example.

In embodiments, the recoat head actuator 144, the print head actuator 154, and the guide 184 may be a cohesive sub-system that is affixed to the rail 180, such as when the recoat head actuator 144 and the print head actuator 154 are similar to the PRO225LM Mechanical Bearing, Linear Motor Stages, for example. However, it should be understood that other embodiments are contemplated and possible, such as embodiments where the recoat head actuator 144 and the print head actuator 154 comprise multiple components that are individually assembled onto the rail 180 to form the recoat head actuator 144 and the print head actuator 154, respectively.

Still referring to FIGS. 2A-2C, the recoat head 140 is coupled to the recoat head actuator 144 such that the recoat head 140 is situated proximate the working axis 116 (FIG. 1) of the additive manufacturing apparatus 100. Thus, bi-directional actuation of the recoat head actuator 144 along the recoat motion axis 146 affects bi-directional motion of the recoat head 140 on the working axis 116 of the additive manufacturing apparatus 100. In the embodiment of the actuator assembly 102 depicted in FIGS. 2A-2C, the recoat head 140 is coupled to the recoat head actuator 144 with strut 212 such that the recoat head 140 is cantilevered from the support 182 and positioned on the working axis 116 (FIG. 1) of the additive manufacturing apparatus 100. Cantilevering the recoat head 140 from the support 182 allows the recoat head actuator 144 and the guide 184 to be spaced apart from, for example, the build platform 120 of the additive manufacturing apparatus 100 thereby reducing the likelihood that the recoat head actuator 144, the guide 184, and associate electrical components will be fouled or otherwise contaminated with build material 400. This increases the maintenance interval for the recoat head actuator, increases the service life of the recoat head actuator, reduces machine downtime, and reduces build errors due to fouling of the recoat head actuator 144. In addition, spacing the recoat head actuator 144 apart from the build platform 120 of the apparatus 100 allows for improved visual and physical access to the build platform 120 and the supply platform 130, improving the ease of maintenance and allowing for better visual observation (from human observation, camera systems, or the like) of the additive manufacturing process. In some embodiments described herein, the recoat head 140 may be fixed in directions orthogonal to the recoat motion axis 146 and the working axis 116 (i.e., fixed along the +/−Z axis and/or fixed along the +/−Y axis).

In embodiments, the recoat head 140 may be pivotally coupled to the recoat head actuator 144. For example and without limitation, in the embodiment of the actuator assembly 102 depicted in FIGS. 2A-2C, the strut 212 is coupled to the recoat head 140 and pivotally coupled to the recoat head actuator 144 at pivot point 214. This allows the recoat head 140 to be pivoted with respect to the recoat head actuator 144 away from the working axis 116 (FIG. 1) of the apparatus 100 to facilitate, for example, maintenance or removal of components of the apparatus positioned below the recoat head 140 (e.g., the build receptacle, supply receptacle, or the like). In embodiments, the pivot point 214 may include an actuator, such as a motor or the like, to facilitate automated pivoting of the recoat head 140. In embodiments, a separate actuator (not depicted) may be provided between the recoat head 140 and the recoat head actuator 144 to facilitate automated pivoting of the recoat head 140. While FIG. 2C depicts the pivot point 214 positioned between the strut 212 and the recoat head actuator 144, it should be understood that other embodiments are contemplated and possible, such as embodiments where the pivot point 214 is positioned between the strut 212 and the recoat head 140.

Still referring to FIGS. 2A-2C, the print head 150 is coupled to the print head actuator 154 such that the print head 150 is situated proximate the working axis 116 (FIG. 2) of the additive manufacturing apparatus 100. Thus, bi-directional actuation of the print head actuator 154 along the print motion axis 156 affects bi-directional motion of the print head 150 on the working axis 116 of the additive manufacturing apparatus 100. In the embodiment of the actuator assembly 102 depicted in FIGS. 2A-2C, the print head 150 is coupled to the print head actuator 154 with strut 216 such that the print head 150 is cantilevered from the support 182 and positioned on the working axis 116 (FIG. 1) of the additive manufacturing apparatus 100. Cantilevering the print head 150 from the support 182 allows the print head actuator 154 and the guide 184 to be spaced apart from, for example, the build platform 120 of the additive manufacturing apparatus 100 thereby reducing the likelihood that the print head actuator 154, the guide 184, and associate electrical components will be fouled or otherwise contaminated with build material 400. This increases the maintenance interval for the print head actuator, increases the service life of the print head actuator, reduces machine downtime, and reduces build errors due to fouling of the print head actuator 154. In addition, spacing the print head actuator 154 apart from the build platform 120 of the apparatus 100 allows for improved visual and physical access to the build platform 120 and the supply platform 130, improving the ease of maintenance and allowing for better visual observation (from human observation, camera systems, or the like) of the additive manufacturing process. In some embodiments described herein, the print head 150 may be fixed in directions orthogonal to the recoat motion axis 146 and the working axis 116 (i.e., fixed along the +/−Z axis and/or fixed along the +/−Y axis).

In embodiments, the print head 150 may be pivotally coupled to the print head actuator 154. For example and without limitation, in the embodiment of the actuator assembly 102 depicted in FIGS. 2A-2C, the strut 216 is coupled to the print head 150 and pivotally coupled to the print head actuator 154 at pivot point 218. This allows the print head 150 to be pivoted with respect to the print head actuator 154 away from the working axis 116 (FIG. 1) of the apparatus 100 to facilitate, for example, maintenance or removal of components of the apparatus positioned below the print head 150 (e.g., the build receptacle, supply receptacle, or the like). In embodiments, the pivot point 218 may include an actuator, such as a motor or the like, to facilitate automated pivoting of the print head 150. In embodiments, a separate actuator (not depicted) may be provided between the print head 150 and the print head actuator 154 to facilitate automated pivoting of the print head 150. While FIG. 2B depicts the pivot point 218 positioned between the strut 216 and the print head actuator 154, it should be understood that other embodiments are contemplated and possible, such as embodiments where the pivot point 218 is positioned between the strut 216 and the print head 150.

In embodiments, the recoat head actuator 144 and the print head actuator 154 overlap over the build receptacle 124. As such, the range of motion of the recoat head actuator 144 (and attached recoat head 140) and the print head actuator 154 (and attached print head 150) also overlap over the build receptacle 124. In embodiments, the range of motion of the recoat head actuator (and attached recoat head 140) is greater than the range of motion of the print head actuator 154 (and attached print head 150). This is true when, for example, the apparatus 100 includes a supply receptacle 134 positioned between the build receptacle 124 and the recoat home position 148.

However, it should be understood that other embodiments are contemplated and possible. For example, in embodiments (not depicted) the recoat head actuator 144 and the print head actuator 154 may overlap along the entire length of the working axis 116 of the apparatus 100. In these embodiments, the range of motion of the recoat head actuator 144 (and attached recoat head 140) and the print head actuator 154 (and attached print head 150) are co-extensive over the working axis 116 of the apparatus 100.

As noted above, in the embodiments described herein the recoat head 140 and the print head 150 are both located on the working axis 116 of the apparatus 100. As such, the movements of the recoat head 140 and the print head 150 on the working axis 116 occur along the same axis and are thus co-linear. With this configuration, the recoat head 140 and the print head 150 may occupy the same space (or portions of the same space) along the working axis 116 of the apparatus 100 at different times during a single build cycle. The recoat head 140 and the print head 150 may be moved along the working axis 116 of the apparatus 100 simultaneously in a coordinated fashion, in the same direction and/or in opposing directions, at the same speeds or different speeds. This, in turn, allows for individual steps of the additive manufacturing process, such as the distributing step (also referred to herein as the recoating step), the depositing step (also referred to herein as the printing step), the curing (or heating) step, and/or the cleaning step to be performed with overlapping cycle times. For example, the distributing step may be initiated while the cleaning step is being completed; the depositing step may be initiated while the distributing step in completed; and/or the cleaning step may be initiated while the distributing step is being completed. This may reduce the overall cycle time of the additive manufacturing apparatus 100 to less than the sum of the distributing cycle time (also referred to herein as the recoat cycle time), the depositing cycle time (also referred to herein as the print cycle time), and/or the cleaning cycle time.

Other embodiments of an actuator assembly (not shown) may be implemented in the embodiments of the additive manufacturing apparatuses 100 depicted in FIG. 1, for example, as an alternative to the actuator assembly 102. As such, it should be understood that other embodiments of the actuator assembly may be utilized to build an object on the build platform 120 in a similar manner as described herein with respect to FIGS. 1-2C.

Referring now to FIGS. 1-2C, in the embodiments described herein, the print head 150 may deposit the binder material 500 on a layer of build material 400 distributed on the build platform 120 through an array of nozzles 172 located on the underside of the print head 150 (i.e., the surface of the print head 150 facing the build platform 120). In embodiments, the array of nozzles 172 are spatially distributed in the XY plane of the coordinate axes depicted in the figures. In some embodiments, the print heads may also define the geometry of the part being built. In embodiments, the nozzles 172 may be piezoelectric print nozzles and, as such, the print head 150 is a piezo print head. In alternative embodiments, the nozzles 172 may be thermal print nozzles and, as such, the print head 150 is a thermal print head. In alternative embodiments, the nozzles 172 may be spray nozzles.

In addition to the nozzles 172, in some embodiment, the print head 150 may further comprise one or more sensors (not depicted) for detecting a property of the build material 400 distributed on the build platform 120 and/or the binder material 500 deposited on the build platform 120. Examples of sensors may include, without limitation, image sensors such as cameras, thermal detectors, pyrometers, profilometers, ultrasonic detectors, and the like. In these embodiments, signals from the sensors may be fed back to the control system (described in further detail herein) of the additive manufacturing apparatus to facilitate feedback control of one or more functions of the additive manufacturing apparatus.

Alternatively or additionally, the print head 150 may comprise at least one energy source (not depicted). The energy source may emit a wavelength or a range of wavelengths of electromagnetic radiation suitable for curing (or at least initiating curing) the binder material 500 deposited on the build material 400 distributed on the build platform 120. For example, the energy source may comprise an infrared heater or an ultraviolet lamp which emit wavelengths of infrared or ultraviolet electromagnetic radiation suitable for curing the binder material 500 previously deposited on the layer of build material 400 distributed on the build platform 120. In instances where the energy source is an infrared heater, the energy source may also preheat the build material 400 as it is distributed from the supply platform 130 to the build platform 120 that may assist in expediting the curing of subsequently deposited binder material 500.

As noted herein, the recoat head 140 is used in the additive manufacturing apparatus 100 to distribute build material 400 and, more specifically, to distribute build material 400 from the supply platform 130 to the build platform 120. That is, the recoat head 140 is used to "recoat" the build platform 120 with build material 400. It is contemplated that the recoat head 140 may include at least one of a roller, blade, or wiper to facilitate the distribution of build material 400 from the supply platform 130 to the build platform 120.

The build material generally comprises a powder material that is spreadable or flowable. Categories of suitable powder material include, without limitation, dry powder material and wet powder material (e.g., a powder material entrained in a slurry). In embodiments, the build material may be capable of being bound together with the binder material. In embodiments, the build material may also be capable of being fused together, such as by sintering. In embodiments, the build material may be an inorganic powder material including, for example and without limitation, ceramic powders, metal powders, glass powders, carbon powder, sand, cement, calcium phosphate powder, and various combinations thereof. In embodiments, the build material may comprise an organic powder material including, for example and without limitation, plastic powders, polymer powders, soap, powders formed from foodstuff (i.e., edible powders), and various combinations thereof. In embodiments, the build material may be a stainless steel (e.g., SS316, 17-4, HK-30 and 304 powders), steel (e.g., 4140, 4605, 8620, and Tool Steel powders), copper alloy, nickel alloy (e.g., Rene 65), or other alloy powder. In some embodiments, the build material may be (or include) pharmaceutically active components, such as when the build material is or contains a pharmaceutical. In embodiments, the build material may be a combination of inorganic powder material and organic powder material. In embodiments, the build material may be a chemically reactive or combustible powder, such as an aluminum or titanium powder.

The build material may be uniform in size or non-uniform in size. In embodiments, the build material may have a powder size distribution such as, for example and without limitation, a bi-modal or tri-modal powder size distribution. In embodiments, the build material may be, or may include, nanoparticles.

The build material may be regularly or irregularly shaped, and may have different aspect ratios or the same aspect ratio. For example, the build material may take the form of small spheres or granules, or may be shaped like small rods or fibers.

In embodiments, the build material can be coated with a second material. For example and without limitation, the build material may be coated with a wax, a polymer, or another material that aids in binding the build material together (in conjunction with the binder). Alternatively or additionally, the build material may be coated with a sintering agent and/or an alloying agent to promote fusing the build material.

The binder material may comprise a material which is radiant-energy curable and which is capable of adhering or binding together the build material when the binder material is in the cured state. The term "radiant-energy curable," as used herein, refers to any material that solidifies in response to the application of radiant energy of a particular wavelength and energy. For example, the binder material may comprise a known photopolymer resin containing photoinitiator compounds functioning to trigger a polymerization reaction, causing the resin to change from a liquid state to a solid state. Alternatively, the binder material may comprise a material that contains a solvent that may be evaporated out by the application of radiant energy. The uncured binder material may be provided in solid (e.g., granular) form, liquid form including a paste or slurry, or a low viscosity solution compatible with print heads. The binder material may be selected to have the ability to out-gas or burn off during further processing, such as during sintering of the build material. In embodiments, the binder material may be as described in U.S. Patent Publication No. 2018/0071820 entitled "Reversible Binders For Use In Binder Jetting Additive Manufacturing Techniques" and assigned to General Electric Corporation, Schenectady, NY. However, it should be understood that other binder materials are contemplated and possible, including combinations of various binder materials.

In embodiments, the recoat head 140 may further comprise at least one energy source. In these embodiments, the energy source(s) may emit a wavelength or a range of wavelengths of electromagnetic radiation suitable for curing (or at least initiating curing) the binder material 500 deposited on the build material 400 distributed on the build platform 120. For example, the energy source may comprise an infrared heater or an ultraviolet lamp which emit wavelengths of infrared or ultraviolet electromagnetic radiation, respectively, suitable for curing the binder material 500 previously deposited on the layer of build material 400 distributed on the build platform 120. In instances where the energy source is an infrared heater, the energy source may also preheat the build material 400 as it is distributed from the supply platform 130 to the build platform 120 that may assist in expediting the curing of subsequently deposited binder material 500.

In some embodiments, the recoat head 140 may further comprise at least one sensor, such as at least one sensor for detecting a property of the build material 400 distributed on the build platform 120 and/or the binder material 500 deposited on the build platform 120. Examples of sensors may include, without limitation, image sensors such as cameras, thermal detectors, pyrometers, profilometers, ultrasonic detectors, and the like. In these embodiments, signals from the sensors may be fed back to the control system (described in further detail herein) of the additive manufacturing apparatus to facilitate feedback control of one or more functions of the additive manufacturing apparatus.

Figure 3:
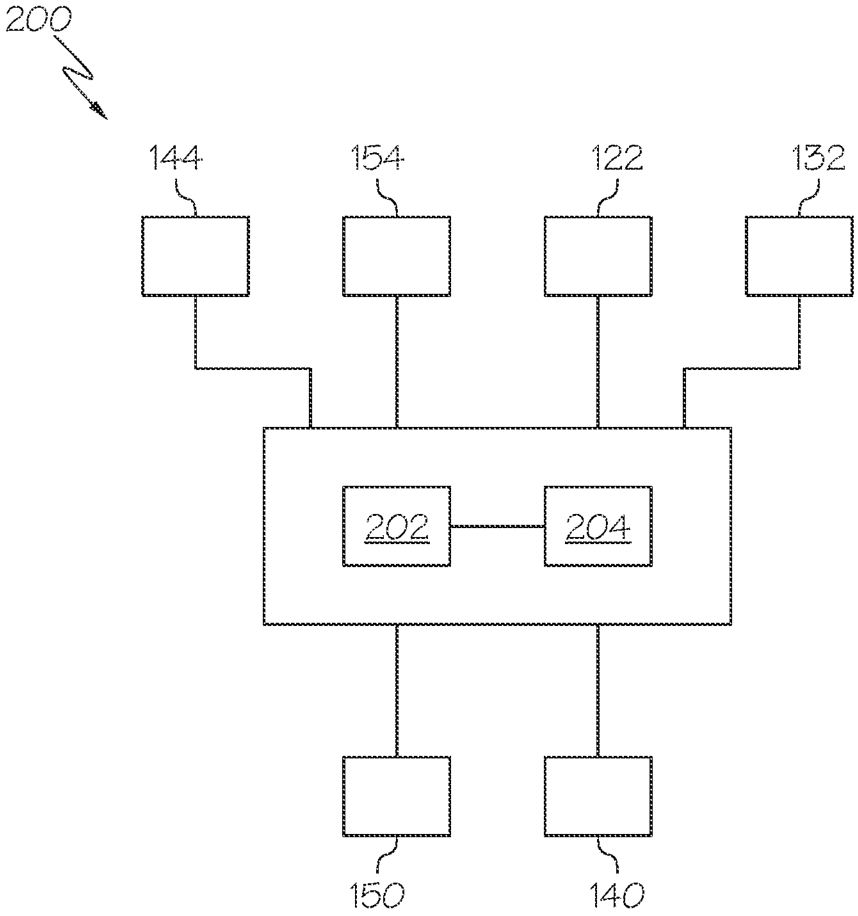
FIG. 3 schematically depicts a portion of control system for an additive manufacturing apparatus according to one or more embodiments shown and described herein.

Referring now to FIGS. 1 and 3, FIG. 3 schematically depicts a portion of a control system 200 for controlling the additive manufacturing apparatus 100 of FIG. 1 with an actuator assembly as depicted in FIGS. 2A-2C. The control system 200 is communicatively coupled to the recoat head actuator 144, the print head actuator 154, the build platform actuator 122, and the supply platform actuator 132. The control system 200 may also be communicatively coupled to the print head 150 and the recoat head 140. In embodiments where additional accessories or components are included, such as process accessories, process accessory actuators, and sensors (not depicted), the control system 200 may also be communicatively coupled to the additional components. In the embodiments described herein, the control system 200 comprises a processor 202 communicatively coupled to a memory 204. The processor 202 may include any processing component(s), such as a central processing unit or the like, configured to receive and execute computer readable and executable instructions stored in, for example, the memory 204. In the embodiments described herein, the processor 202 of the control system 200 is configured to provide control signals to (and thereby actuate) the recoat head actuator 144, the print head actuator 154, the build platform actuator 122, the supply platform actuator 132, and any additional components (when included). The processor 202 may also be configured to provide control signals to (and thereby actuate) the print head 150 and the recoat head 140. The control system 200 may also be configured to receive signals from one or more sensors of the recoat head 140 and, based on these signals, actuate one or more of the recoat head actuator 144, the print head actuator 154, the build platform actuator 122, the supply platform actuator 132, the print head 150, and/or the recoat head 140.

In the embodiments described herein, the computer readable and executable instructions for controlling the additive manufacturing apparatus 100 are stored in the memory 204 of the control system 200. The memory 204 is a non-transitory computer readable memory. The memory 204 may be configured as, for example and without limitation, volatile and/or nonvolatile memory and, as such, may include random access memory (including SRAM, DRAM, and/or other types of random access memory), flash memory, registers, compact discs (CD), digital versatile discs (DVD), and/or other types of storage components.

Referring to FIG. 1, the additive manufacturing apparatus 100 is schematically depicted at initiation of a build cycle. The phrase "build cycle," as used herein, refers to the process of building a single layer of an object on the build platform 120. In the embodiments described herein, the "build cycle" may include one iteration each of raising the supply platform 130, lowering the build platform 120, distributing a new layer of build material 400 from the supply platform 130 to the build platform 120, depositing binder material 500 on the new layer of build material 400 distributed on the build platform 120, and optionally the cleaning of the print head 150.

While FIG. 1 depicts an additive manufacturing apparatus 100 comprising a supply receptacle 134 used in conjunction with the recoat head 140 of the actuator assembly 102 to supply build material 400 to the build platform 120 of the build receptacle 124, it should be understood that other embodiments are contemplated and possible. For example, in embodiments, the apparatus 100 may include a build material hopper instead of a supply receptacle. In such embodiments, the build material hopper may be coupled to the recoat head actuator 144 or fixed over the build platform 120. Moreover, while FIG. 1 depicts an additive manufacturing apparatus 100 comprising actuator assemblies as depicted in FIGS. 2A-2C, it should be understood that other configurations of actuator assemblies are contemplated and possible.

Moreover, it should be understood that, although various embodiments described herein are described with reference to a print head depositing a binder material onto a powder bed, other additive manufacturing modalities are contemplated and possible. For example, the print head described herein may be replaced with a laser or other energy beam or another consolidation apparatus.

The foregoing description includes various embodiments of components of additive manufacturing apparatuses and methods for using the same. It should be understood that various combinations of these components, including the print head 150, the recoat head 140, and the linear motion stage coupled to the print head actuator 154 and the recoat head actuator 144 are provided within a process chamber in which the environment is controlled by a closed-loop environmental system. The environmental system enables the process chamber to be changed between an inert state (in which chemically reactive powders can be used as a build material, for example) and a non-inert state. Accordingly, various embodiments of the additive manufacturing system enable a broader range of build materials to be used, as well as for additional control of the environment in the process chamber, which can increase the precision between builds.

In various embodiments, certain components are described as being "upstream" or "downstream" from one another. As used herein, the term "upstream" refers to moving in a direction toward the outlet to the process chamber, or a component being relatively closer to the outlet of the process chamber as compared to another component along a flow path in the direction of fluid flow. The term "downstream" used in conjunction with "upstream" refers to a direction toward the inlet of the process chamber, or being relatively closer to the inlet of the process chamber as compared to another component. In general, the fluid flow through the environmental system is from upstream to downstream. As used herein, the term "directly," when used in conjunction with "upstream" or "downstream" refers to an arrangement in which a flow of gas flows from the first component to the second component without passing through an intervening component. However, it is contemplated that the flow of gas may pass by one or more sensors, or through one or more valves without impacting the direct relation between the components.

Figure 4:
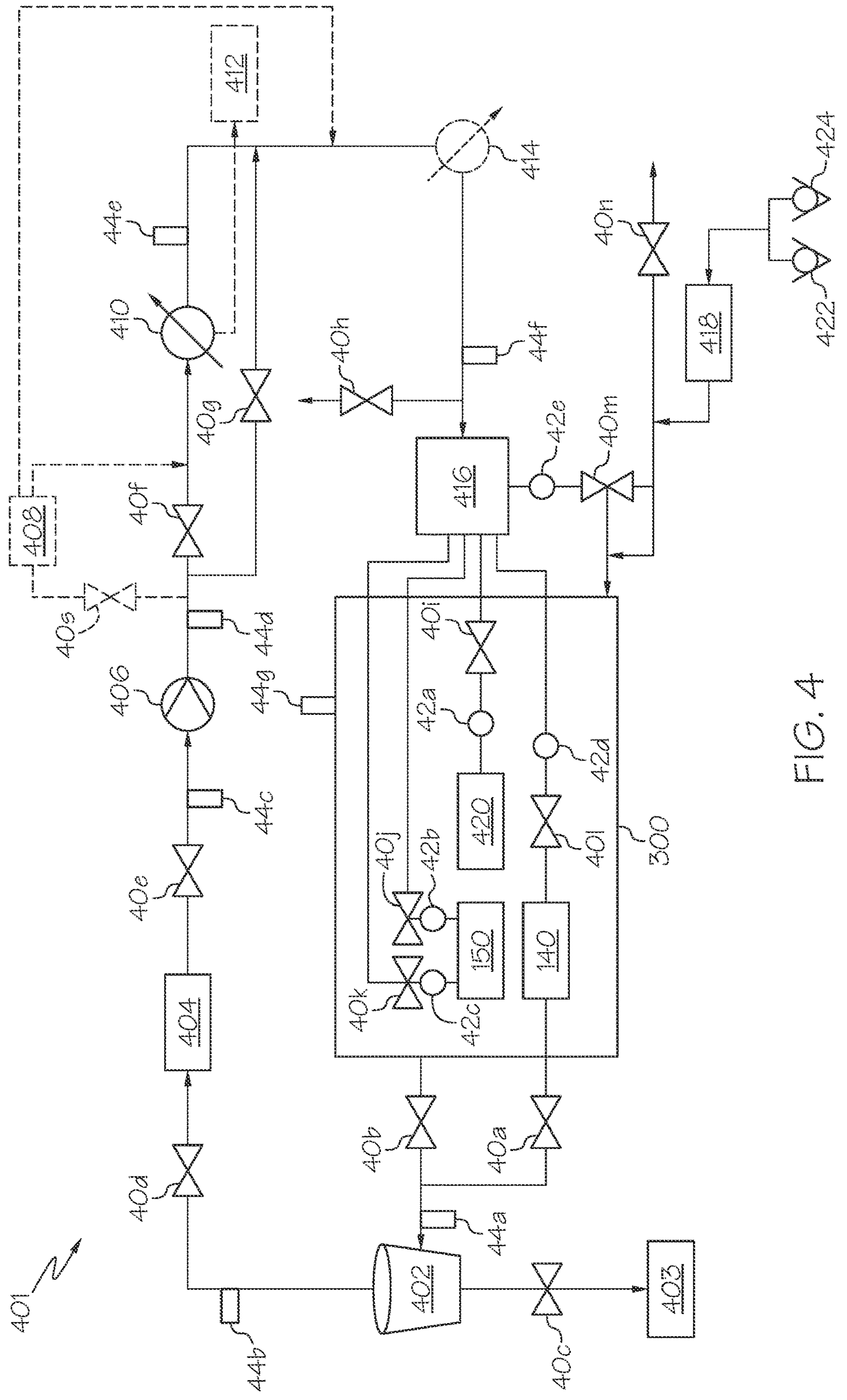
FIG. 4 schematically depicts an example environmental system of an additive manufacturing apparatus according to one or more embodiments shown and described herein.
Figure 5:
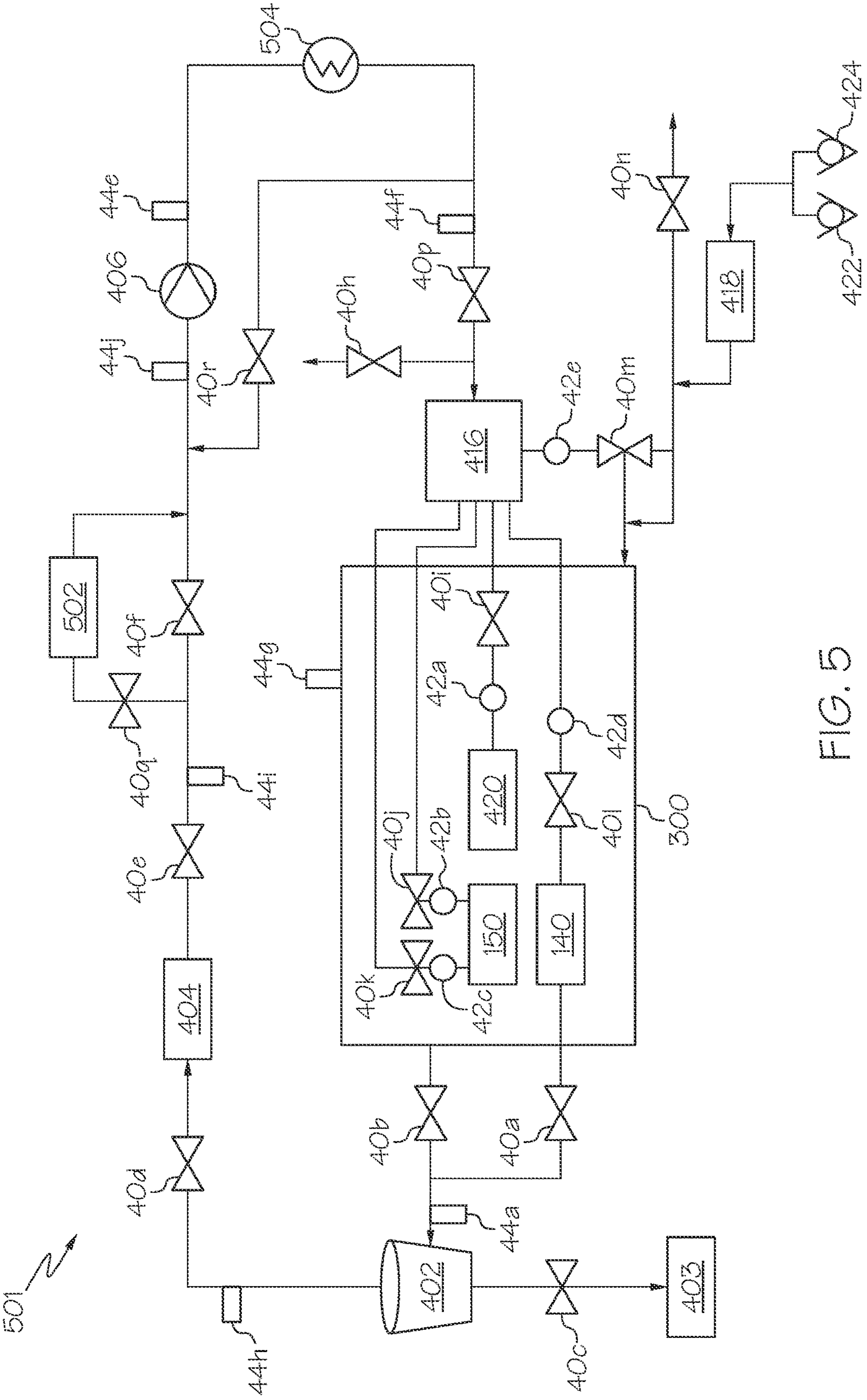
FIG. 5 schematically depicts another example environmental system of an additive manufacturing apparatus according to one or more embodiments shown and described herein.

Referring to FIGS. 4 and 5 by way of example, embodiments of an environmental system 401, 501 of an additive manufacturing apparatus are schematically depicted. In general, the environmental system 401, 501 includes a process chamber 300 surrounding a print head 150, a recoat head 140, and a linear motion stage 420. The linear motion stage 420 is coupled to the print head actuator 154 and the recoat head actuator 144, as described hereinabove. The print head 150 and the recoat head 140 operate within the process chamber 300 to build a three-dimensional object by depositing a build material 400 and a binder material 500, as described above. A number of valves, generally and collectively referred to as valves 40, or individually referred to by the reference number 40 followed by an alphabetic indicator (e.g., 40*a*, 40*b*, etc.) are present in the environmental system 401, 501, which are operable to control the flow of gas to and from various components making up closed-loop of the environmental system 401, 501. Additionally, a number of sensors, generally and collectively referred to as sensors 44, or individually referred to by the reference number 44 followed by an alphabetic indicator (e.g., 44*a*, 44*b*, etc.), are located at various points throughout the closed-loop of the environmental system. In embodiments, one or more of the valves 40 may be operated based on information provided to a control system (such as control system 200 in FIG. 2) by one or more of the sensors 44.

In the description below, the sensors 44 positioned throughout the closed-loop environmental system can include one or more sensors at each location a sensor 44 is indicated. Suitable sensors can include, by way of example and not limitation, pressure sensors, temperature sensors, humidity sensors, vapor sensors, volatile organic compound (VOC) sensors, lower explosive limit (LEL) sensors, oxygen sensors, or the like.

As shown in FIGS. 4 and 5, a particle separation system 402 is fluidly coupled to the process chamber 300 to receive a particle-laden stream from the process chamber 300. For example, in embodiments, when valves 40*a* and 40*b* are opened, a gaseous stream that includes particles of build material 400 and water and/or solvent vapors generated by the volatilization of cleaning fluid and binder material 500 is extracted from the process chamber 300.

In FIGS. 4 and 5, the valve 40*a* is positioned between the recoat head 140 and the particle separation system 402. The valve 40*a* can be used to control the flow of gas that is received by the recoat head 140, such as through a vacuum system coupled to the recoat head 140. In embodiments, the vacuum system draws a flow of gas through the recoat head 140 at a flow rate of greater than about 20 cubic feet per minute (CFM). Accordingly, the vacuum system can include a tube coupled to an inlet in the recoat head 140 that draws a flow of gas through the recoat head 140 to remove build material that is aerosolized as a result of the recoat head 140 disturbing the build material during its passage over the build surface or any other surface covered in powder. The vacuum system can vary depending on the particular embodiment, but provided it is effective to remove build material that is aerosolized or fluidized within the process chamber 300. One example of a vacuum system suitable for use is described in greater detail in Patent Application Number PCT/US20/34204, filed on May 22, 2020, entitled "Additive Manufacturing Recoat Assemblies Including a Vacuum and Methods for Using the Same," the contents of which is hereby incorporated by reference. It is contemplated that, in some embodiments, the recoat head 140 may not include such a vacuum system, and, therefore, in such embodiments, the valve 40*a* may not be included. In embodiments, when included, the valve 40*a* is a throttling valve that enables the flow of gas from the recoat head 140 to be turned on, turned off, or regulated, although it is contemplated that other types of valves can be used.

Another valve, valve 40*b*, is positioned between the process chamber 300 and the particle separation system 402 for controlling the flow of gas out of the process chamber 300. In embodiments, the valve 40*b* is a throttling valve that enables the flow of gas from the process chamber 300 to be turned on, turned off, or regulated, although it is contemplated that other types of valves can be used.

As shown in FIGS. 4 and 5, when included, the flow through valve 40*a* joins the flow through valve 40*b* upstream of the particle separation system 402. In embodiments, a venturi (not shown) is included in the flow path where the flow through the valve 40*a* joins the flow through valve 40*b*. When included, the venturi generates a low pressure zone at the throat of the venturi, which is effective to drive the suction flow from the recoat head 140. In embodiments, the venturi has a geometry that is selected to meet a minimum flow rate for the environmental system, which can vary, for example, based on a volume of the recoat head 140 and the suction flow of the gas drawn through the recoat head 140.

At least one sensor 44*a* is positioned immediately upstream of the particle separation system 402. Although a single sensor 44*a* is depicted, it is contemplated that any number of sensors 44 may be positioned along the flow path upstream of the particle separation system 402. For example, in some embodiments, sensor 44*a* can include a temperature sensor, a pressure sensor, or both. The temperature sensor measures a temperature of the particle-laden stream, while the pressure sensor measures a pressure of the particle-laden stream. When included, information received from the pressure sensor can be used to determine if a leak is present in the closed loop of the environmental system.

The particle separation system 402 separates at least some of the particles out and passes the particles to a material handling system 403. In embodiments, a valve 40*c* controls the flow of the particles out of the environmental system to the material handling system 403. As will be described in greater detail below, the valve 40*c*, in embodiments, is an on/off valve that enables particles to pass from the particle separation system 402 to the material handling system 403 when in the on position and prevents particles from passing from the particle separation system 402 to the material handling system 403 when in the off position. However, other types of valves may be used. The separation of at least some of the particles from the particle-laden stream by the particle separation system 402 results in a reduced-particle stream, which is passed to a filter 404 that is fluidly coupled to the particle separation system 402. In embodiments, the particle separation system 402 is the particle separation system shown and described in any one of FIGS. 6-8, although it is contemplated that other particle separation systems may be used depending on the particular embodiment.

In various embodiments, the particle separation system 402 is effective to remove greater than about 50 wt %, greater than 75 wt %, greater than 80 wt %, greater than 85 wt %, greater than 90 wt %, greater than 95 wt %, or even greater than 97 wt % of the particles in the particle-laden stream. In embodiments, the particle separation system 402 separates particles greater than about 5.0 micron (μm), greater than about 4.0 μm, greater than about 3.5 μm, greater than about 3.0 μm, greater than about 2.5 μm, greater than about 2.0 μm, greater than about 1.5 μm, or even greater than about 1.0 μm from the particle-laden stream. Accordingly, in embodiments, the particle separation system 402 reduces the load on the filter 404 by removing a majority of the particles from the particle-laden stream.

As shown in FIGS. 4 and 5, in embodiments, a sensor 44*b* is positioned along the flow path between the particle separation system 402 and the filter 404. Although a single sensor 44*b* is depicted, it is contemplated that any number of sensors 44 may be positioned along the flow path between the particle separation system 402 and the filter 404. For example, in some embodiments, sensor 44*b* can include a temperature sensor, a pressure sensor, or both. In one particular embodiment, a pressure sensor and a temperature sensor are positioned between the particle separation system 402 and the filter 404. In another embodiment, a pressure sensor is between the particle separation system 402 and the filter 404. When sensor 44*b* includes a pressure sensor, it can be used to determine if a leak is present in the closed loop of the environmental system. Additionally or alternatively, in conjunction with the sensor 44*a* (when sensor 44*a* includes a pressure sensor), information from the sensor 44*b* can be used to determine if a problem exists with the particle separation system 402. Such problems may be indicated, for example, by a pressure drop (e.g., a difference in pressure between the pressure sensed by sensor 44*a* and the pressure sensed by sensor 44*b*) that is greater than expected (e.g., a threshold pressure difference).

In embodiments, the filter 404 is a high efficiency particulate air (HEPA) filter (as defined by the United States Department of Energy). For example, in embodiments, the filter 404 is a HEPA filter capable of removing at least 99.97% of particles whose diameter is 0.3 μm. Other types of filters can be used, provided they are capable of removing the remaining particles from the reduced-particle stream. For example, other types of filters may be used when build material having larger particle sizes are used. Additionally or alternatively, different types of filters may be used depending on other system components and requirements, such as available pressure drop and flow rates. In embodiments, the build material 400 has d10 of greater than or equal to 3.5 μm, and a HEPA filter is used as the filter 404. In various embodiments, the filter 404 removes the remaining particles of build material 400 from the reduced-particle stream and provides a clean gas stream.

As shown in FIGS. 4 and 5, in embodiments, valves 40*d* and 40*e* are provided immediately upstream and immediately downstream of the filter 404, respectively, to enable the filter 404 to be fluidly isolated. Accordingly, in such embodiments, the filter 404 can be removed, cleaned, or replaced without enabling the gas within the environmental system 401, 501 to leak out of the closed-loop. In embodiments, the valves 40*d* and 40*e* are manual on/off valves, which can be operated between an on position in which gas may flow through the filter 404 and an off position in which gas is prevented from flowing through the filter 404 by an operator. However, other types of valves, including automatic valves, are contemplated and possible.

As shown in FIGS. 4 and 5, the filter 404 is fluidly coupled to a blower 406. Although FIGS. 4 and 5 are shown as including only a single blower 406, it is contemplated that, in embodiments, one or more additional blowers may also be included. For example, the particle separation system 402 may include a blower. In FIG. 4, the filter 404 passes the clean gas stream directly to the blower 406, although in FIG. 5, at least some of the clean gas stream is passed through a dehumidifier 502 (discussed in greater detail below) before being provided to the blower 406. The blower 406 circulates the clean gas stream through the environmental system. Any one of a number of commercially available blowers can be included as the blower 406, including, but not limited to, those available as HRD 2T FU ATEX™, such as HRD 2T FU-95/2.2 with variable frequency drive (VFD), available from Elektror Airsystems Gmbh (Germany), or the 3TA series centrifugal blower available from Airtech Vacuum coupled with a VFD. Other blowers may be used, provided they are able to provide the pressure and flow rate required by the system. For example, in embodiments, the blower 406 provides greater than or equal to 70 mbar, greater than or equal to 75 mbar, greater than or equal to 80 mbar, or even greater than or equal to 85 mbar of driving pressure for the gas flowing through the environmental system. The blower

406 may also be selected, for example, based on blower characteristic speed, adiabatic efficiency, power, max flow rate, or the like. It should be appreciated that the selection of the blower 406 can and will impact the selection of other components in the system, including, but not limited to, the particle separation system 402 and the filter 404. In particular, the acceptable pressure drop over the various components in the system, including the venturi, the particle separation system 402 and the filter 404, will depend on the pressure tolerances of the blower 406.

Although described herein as being positioned upstream of the blower 406, it is contemplated that, in embodiments, the dehumidifier 502 can be positioned downstream of the blower 406. It should be appreciated that the order of the components can vary depending on the particular components selected, as well as other system operating parameters. For example, the use of a blower that is inert to the vapors from the binder and cleaning fluid can enable the gas to be passed through the blower without needing to have vapors extracted therefrom. Moreover, embodiments in which the vapor content and specific gas used within the process chamber do not pose a combustion risk and/or embodiments in which the blower does not operate in a condensing environment, can enable the gas to be passed through the blower without needing to have vapors extracted therefrom. Accordingly, it should be understood that the gas may be conditioned or treated upstream or downstream of the blower, depending on the environment, operating parameters, gas content, and particular blower selected.

In embodiments, such as the embodiment shown in FIG. 4, a sensor 44*c* is positioned along the flow path between the filter 404 and the blower 406. For example, the sensor 44*c* is positioned downstream of the filter 404 and the valve 40*e*, and upstream of the blower 406. Although a single sensor 44*c* is depicted, it is contemplated that any number of sensors 44 may be positioned along the flow path between the filter 404 and the blower 406. For example, in some embodiments, sensor 44*c* can include a temperature sensor, a pressure sensor, or both. In one particular embodiment, a pressure sensor and a temperature sensor are positioned between the filter 404 and the blower 406.

In embodiments, the sensors 44*b* and 44*c* each include pressure sensors. Accordingly, together, the sensors 44*b* and 44*c* can provide information regarding the capacity of the filter 404, as well as indicate when the filter 404 needs replacement.

In the embodiment illustrated in FIG. 4, the clean gas stream from the blower 406 may optionally be passed to a concentrator 408. When included, the concentrator 408 concentrates vapors (e.g., vapors released from the cleaning fluid and/or the binder material 500) in the clean gas stream to reduce the amount of gas flow that is passed through a condenser system 410. For example, the concentrator 408 can concentrate the vapors present in the clean gas stream into a volume of less than about 50% (v/v) that is passed to the condenser system 410, while the remaining volume of the clean gas stream is passed back into the loop at a point downstream of the condenser system 410. Accordingly, when included, the concentrator 408 may improve the overall efficiency of the system. When the concentrator 408 is included and to be used, valves 40*f* and 40*g* can be closed to force the clean gas stream to pass through the concentrator 408, and valve 40*s* can be opened to enable fluid communication with the concentrator 408.

As shown in FIG. 4, sensor 44*d* is positioned downstream of the blower 406. In embodiments, although depicted as a single sensor 44*d*, sensor 44*d* can include a pressure sensor, a temperature sensor, and/or a humidity sensor. In some embodiments, a VOC or LEL sensor can be used in place of a humidity sensor. Accordingly, in embodiments, a pressure sensor, a temperature sensor, and a VOC sensor are positioned immediately downstream of the blower 406. In embodiments, a pressure sensor, a temperature sensor, and a LEL sensor are positioned immediately downstream of the blower 406. In embodiments, a pressure sensor, a temperature sensor, and a humidity sensor are positioned immediately downstream of the blower 406. Information from the sensor(s) 44*d* can be used, for example, to determine whether valve 40*f*, valve 40*g*, or both of valves 40*f* and 40*g* should be closed, and whether valve 40*s* should be opened to alter the path of the clean gas stream exiting the blower 406. For example, information from one or more of the humidity sensor, VOC sensor, LEL sensor, and the temperature sensor can be used to determine that the clean gas stream has a temperature $T_1$ and a vapor concentration of $V_1$, and that an undesirable level of vapors is present in the clean gas stream (e.g., $V_1 > V_{threshold}$, where $V_{threshold}$ is a threshold level of vapors). Accordingly, the valves 40*f*, 40*g*, and/or 40*s* can be adjusted (e.g., valves 40*f* and 40*g* are closed and valve 40*s* is opened) to cause the clean gas stream to flow through the concentrator 408. Alternatively, information from one or more of the humidity sensor, VOC sensor, LEL sensor, and the temperature sensor can be used to determine that the clean gas stream has a temperature $T_1$ and a vapor concentration of $V_1$, and that the levels of vapors present in the clean gas stream are acceptable (e.g., $V_1 \leq V_{threshold}$). Accordingly, the valves 40*f*, 40*g*, and/or 40*s* can be adjusted (e.g., valves 40*f* and/or 40*g* are opened and valve 40*s* is closed) to cause the clean gas stream to bypass the concentrator 408. Additionally or alternatively, when the concentrator 408 and the valve 40*s* are not present, information from one or more of the humidity sensor, VOC sensor, LEL sensor, and the temperature sensor can be used to determine that the clean gas stream has a temperature $T_1$ and a vapor concentration of $V_1$, that the levels of vapors present in the clean gas stream are acceptable (e.g., $V_1 \leq V_{threshold}$), and the valves 40*f* and/or 40*g* can be adjusted (e.g., valve 40*f* is closed and valve 40*g* is opened) to cause the clean gas stream to bypass the condenser system 410. Additionally or alternatively, when the concentrator 408 and the valve 40*s* are not present, information from one or more of the humidity sensor, VOC sensor, LEL sensor, and the temperature sensor can be used to determine that the clean gas stream has a temperature $T_1$ and a vapor concentration of $V_1$ and that undesirable levels of vapors are present in the clean gas stream (e.g., $V_1 > V_{threshold}$), and the valves 40*f* and/or 40*g* can be adjusted (e.g., valve 40*f* is opened and valve 40*g* is closed) to cause the clean gas stream to flow to the condenser system 410.

In embodiments, one or both of valves 40*f* and 40*g* are throttling valves that can be used to turn on the flow of the clean gas stream, turn off the flow of the clean gas stream, or regulate the flow of the clean gas stream. Accordingly, it should be understood that although the previous description of the operation of the valves 40*f* and 40*g* refers to merely opening and closing the valves, the flow of the clean gas stream through the concentrator and/or the condenser system can be further controlled through the use of the throttling valves. However, other types of valves are possible and contemplated.

In embodiments in which the concentrator 408 is not included, or when the concentrator 408 is included and bypassed, the clean gas stream is passed from the blower 406 to the condenser system 410. The condenser system 410, in various embodiments, includes a condensing unit and evaporator coil, and is operable to extract vapors from the clean gas stream, including, by way of example and not limitation, water and other solvent vapors released into the environment by the cleaning fluid in the cleaning station 110 (FIG. 1), and vapors from the binder material being deposited and cured within the process chamber. The condenser system 410 can be, by way of example and limitation, an air conditioner conventionally used in commercial HVAC systems, such as those manufactured by and commercially available from Trane Technologies. In embodiments, the condenser system 410 can be a 2.5 ton or larger commercial HVAC system, such as the PUY-A30NHA7 condensing unit from Mitsubishi Electric Trane HVAC US LLC (Suwanee, GA) and DXG07C15 evaporator coil from Coilmaster Corporation (Moscow, TN).

The condenser system 410 removes the vapors from the clean gas stream and, in embodiments, provides the fluid (e.g., the condensed vapors) to a cleaning fluid reservoir 412, where the fluid may be recycled through a cleaning fluid recirculation loop (not shown). In other embodiments, the condensed vapors can be removed from the system or sent to a waste reservoir (not shown). In embodiments, the condensed vapors can be separated, cleaned, and/or treated for recirculating and/or sending to a waste reservoir. Other methods of processing the condensed vapors are contemplated. The clean gas stream, having had the vapors removed, is then passed from the condenser system 410 to an optional heating coil 414.

In embodiments, a sensor 44*e* is located in the pathway immediately downstream of the condenser system 410. In embodiments, although depicted as a single sensor 44*e*, sensor 44*e* can include a pressure sensor and/or a temperature sensor. Information from sensor 44*e* can include information regarding the pressure of the clean gas stream from the condenser system 410 and/or information regarding the temperature of the clean gas stream from the condenser system 410, which can be used, for example, to identify leaks in the closed-loop of the environmental system, to identify functional issues with the condenser system 410, or the like. In embodiments in which a temperature sensor is included as sensor 44*e*, information from the sensor can be used to adjust one or more parameters of the heating coil 414, when included. In embodiments, the clean gas stream received from a condenser system 410 has a temperature $T_2$ and a vapor concentration of $V_2$, where $T_2<T_1$, and where $V_2<V_1$. Accordingly, the condenser system receives a gas stream with a first vapor content $V_1$ from the process chamber and provides the gas stream with a second vapor content $V_2$ to the process chamber.

When included, the heating coil 414 may be used to increase the temperature of the clean gas stream. For example, if the clean gas stream from the condenser system 410 has a temperature that is lower than expected (e.g., lower than a threshold temperature), the heating coil 414 can be adjusted to bring the clean gas stream up to the desired temperature. One example of a suitable heating coil 414 is a finned trip heater commercially available as Model No. CSF00131 from Tempco Electric Heater Corporation (Wood Dale, IL). From the heating coil 414, when included, the clean gas stream flows to a plenum 416. Accordingly, in embodiments, the clean gas stream exiting the heating coil 414 has a temperature $T_3$ and a vapor concentration of $V_3$, where $T_3>T_2$, and where $V_3 \approx V_2$.

Although the embodiment shown in FIG. 4 includes a blower 406, an optional concentrator 408, a condenser system 410, and an optional heating coil 414, it is contemplated that other components may be used to treat and condition the clean gas stream exiting the filter 404. For example, in the embodiment shown in FIG. 5, the environmental system 501 includes a dehumidifier 502, a blower 406, and a heat exchanger 504.

In FIG. 5, the valve 40*e* is positioned immediately downstream from the filter 404. A sensor 44*i* is located downstream from the valve 40*e*. In embodiments, although depicted as a single sensor 44*i*, sensor 44*i* can include a pressure sensor, a humidity sensor, a VOC sensor, and/or a LEL sensor. In embodiments, sensor 44*i* includes a pressure senor and a humidity sensor. In embodiments, sensor 44*i* includes a pressure senor and a VOC sensor. In embodiments, sensor 44*i* includes a pressure senor and a LEL sensor. Information from sensor 44*i* can include information regarding the pressure of the clean gas stream from the filter 404 and/or information vapor content of the clean gas stream, which can be used, for example, to determine that the clean gas stream has a temperature $T_1$ and a vapor content $V_1$, and whether the clean gas stream should be diverted to the dehumidifier 502 or passed directly to the blower 406. In embodiments, valves 40*f* and 40*q* can be operated to direct the clean gas stream based on the information from the sensor 44*i*.

For example, in embodiments, in response to information from the sensor 44*i* indicating that the vapor content of the clean gas stream is greater than desired (e.g., $V_1>V_{threshold}$, where $V_{threshold}$ is a threshold vapor content value), valve 40*f* can be closed and valve 40*q* can be opened to cause the clean gas stream to flow to the dehumidifier 502. As another example, in embodiments, in response to information from the sensor 44*i* indicating that the vapor content of the clean gas stream is within a desired range (e.g., $V_1 \leq V_{threshold}$), valve 40*f* can be opened and valve 40*q* can be closed to cause the clean gas stream to bypass the dehumidifier 502 and flow to the blower 406. In embodiments, the valves 40*f* and 40*q* are on/off valves that either permit or prevent the clean gas stream from passing along the flow path, although other types of valves are possible and contemplated.

The dehumidifier 502, in embodiments, is operable to remove vapor or moisture from the clean gas stream. In some embodiments, the dehumidifier is a desiccant-based dehumidifier, such as the TTR-400D™ desiccant dehumidifier commercially available from Trotec, Gmbh (Heinsberg, Germany). Other types of dehumidifiers, including cooling-based dehumidifiers, may be used in embodiments, provided they are capable of maintaining the humidity of the closed-loop system within the range acceptable according to the embodiment. However, in embodiments in which a relatively large amount of moisture should be removed (e.g., greater than about 1 kg/hour) from the clean gas stream, a desiccant-based dehumidifier may provide improved moisture removal. In embodiments, the clean gas stream exiting the dehumidifier 502 has a vapor content $V_2$, where $V_2<V_1$.

After the clean gas stream passes through (or bypasses) the dehumidifier 502, the clean gas stream flows to the blower 406. In embodiments, a sensor 44*j* is positioned immediately upstream from the blower 406. In embodiments, although depicted as a single sensor 44*j*, sensor 44*j* can include a pressure sensor, a temperature sensor, and/or an oxygen sensor. In embodiments, sensor 44*j* includes a pressure sensor, a temperature sensor, and a pair of oxygen sensors.

In FIG. 5, following the blower 406, the clean gas stream flows past sensor 44*e* (described hereinabove with respect to FIG. 4) to the heat exchanger 504. The heat exchanger 504 is selected, for example, based on an estimated heat load to be removed from the clean gas stream to achieve the desired temperature. In embodiments, the heat load can be estimated based on heat within the process chamber 300, heat from the blower 406, and heat from the dehumidifier 502, and can vary based on the type of gas included in the clean gas stream (e.g., air, $N_2$, or argon). One example of a commercially available heat exchanger 504 suitable for use is the RV 1.17-0-114.12 available from Becker GmbH (Germany). In embodiments, the heat exchanger 504 is coupled to a chiller (not shown). Accordingly, the heat exchanger 504, in conjunction with the chiller, operates to remove heat from the clean gas stream and pass it out of the system through the chiller. Although in various embodiments the heat exchanger 504 is used to remove heat from the clean gas stream (e.g., lower the temperature of the clean gas stream), it is contemplated that in embodiments, the heat exchanger 504 can be used to heat the clean gas stream (e.g., increase the temperature of the clean gas stream), such as by running hot water through the chiller, and transferring heat from the hot water to the clean gas stream.

Downstream from the heat exchanger, valves 40*p* and 40*r* operate to either direct the flow of the clean gas stream back to the blower 406 or toward the plenum 416. For example, valve 40*p* can be closed and valve 40*r* can be opened to recirculate the clean gas stream from the heat exchanger 504 to the blower 406. Such recirculation can, for example, prevent the blower from overheating by allowing the gas to bypass the process chamber, particle separator, and filter, for example. Alternatively, valve 40*p* can be opened and valve 40*r* can be closed to direct the clean gas stream toward the plenum 416. In embodiments, valve 40*r* is a throttling valve that regulate or prevent the flow of the clean gas stream back to the blower 406. Accordingly, in embodiments, valves 40*p* and 40*r* can be opened such that a portion of the clean gas stream can be recirculated to the blower 406 while the remainder of the clean gas stream is passed to the plenum 416. Such a configuration, for example, can enable the system to compensate for running the blower at a higher speed than may be required. In embodiments, valve 40*p* is an on/off valve that operates to either permit or prevent the flow of the clean gas stream from flowing along the flow path. In some embodiments, one or both of the valves 40*p* and 40*r* can be operated in response to information received from sensor 44*f*.

In the embodiment shown in FIG. 4, the sensor 44*f* is positioned upstream of the plenum 416 and downstream of the heating coil 414 (when included) or the condenser system 410. In the embodiment in FIG. 5, the sensor 44*f* is positioned downstream of the heat exchanger 504. Sensor 44*f* is a final check sensor that determines whether the clean gas stream is suitable for provision to the process chamber 300. In embodiments, although depicted as a single sensor 44*f*, sensor 44*f* can include a pressure sensor, a temperature sensor, a humidity sensor, and/or an oxygen sensor. In some embodiments, a VOC or LEL sensor can be used in place of a humidity sensor. Accordingly, in embodiments, sensor 44*f* includes a temperature sensor, a pressure sensor, an oxygen sensor, and a humidity sensor. In embodiments, sensor 44*f* includes a temperature sensor, a pressure sensor, an oxygen sensor, and a VOC sensor. In embodiments, sensor 44*f* includes a temperature sensor, a pressure sensor, an oxygen sensor, and a LEL sensor. In embodiments, sensor 44*f* includes a temperature sensor, a pressure sensor, and a humidity sensor. In embodiments, sensor 44*f* includes a temperature sensor, a pressure sensor, and a VOC sensor. In embodiments, sensor 44*f* includes a temperature sensor, a pressure sensor, and a LEL sensor. Other combinations of sensors are contemplated and possible.

As shown in both FIGS. 4 and 5, a relief valve 40*h* is positioned along the flow path upstream of the plenum 416. The relief valve 40*h* enables a volume of the clean gas stream to be exhausted from the environmental system 401, 501, as may be needed to prevent over-pressurization of the process chamber 300. In embodiments the relief valve 40*h* is a mechanical valve that opens when the pressure exceeds the threshold pressure level. For example, the walls of the process chamber are designed to withstand a certain pressure, and a threshold pressure level may be set based on the limit of the process chamber. Accordingly, when the pressure exceeds the threshold pressure level downstream of the blower, then the relief valve 40*h* will open and reduce the pressure of the entire system.

The plenum 416 provides a flow of the clean gas stream to a linear motion stage 420, as well as the print head 150 and the recoat head 140. In particular, in various embodiments, the linear motion stage 420 is coupled to the plenum 416 through a valve 40*i* and a flow meter 42*a*. In embodiments, the valve 40*i* is a pinch valve, although other types of valves are contemplated and possible. The clean gas stream flowing to the linear motion stage 420 provides positive pressure to the linear motion stage 420, which may prevent contaminants (e.g., build material) from entering cavities of the linear motion stage 420.

The print head 150 is coupled to the plenum 416 through valves 40*j* and 40*k* and flow meters 42*b* and 42*c*. In embodiments, valve 40*j* and flow meter 42*b* are located along the flow path between the plenum 416 and a manifold within the print head 150 that provide a flow of gas to cool the electronics within the print head 150, including print head circuit boards and the like. Valve 40*k* and flow meter 42*c*, in embodiments, are located along the flow path between the plenum 416 and a gas flow outlet that flows the clean gas stream across IR lamps positioned on the print head 150 to cool the IR lamps and/or to purge a cavity around the IR lamps, such as from contaminants and the like. It is contemplated that, in embodiments in which the print head does not include IR lamps, valve 40*k* and flow meter 42*c* may be omitted. In embodiments, valves 40*j* and 40*k* are pinch valves, although other types of valves are contemplated and possible. However, the use of pinch valves enables the valves 40*j* and 40*k* to be precisely controlled to enable a predetermined flow rate. The flow rate may depend on, for example, the number of IR lamps positioned on the print head 150, the heat output by the IR lamps, or the like. In embodiments, the flow of the clean gas stream used for cooling the electronics within the print head 150 is from about 10 cubic feet per minute (CFM) to about 15 CFM. In embodiments, the flow of the clean gas stream for cooling the IR lamps is from about 3 CFM to about 5 CFM per lamp.

The recoat head 140 is coupled to the plenum 416 through a valve 40*l* and a flow meter 42*d*, as shown in both FIGS. 4 and 5. In particular, the clean air stream is passed to the recoat head 140 through the valve 40*l* to a gas flow outlet that flows the clean gas stream across IR lamps positioned on the recoat head 140 to cool the IR lamps and/or to purge a cavity around the IR lamps, such as from contaminants and the like. It is contemplated that, in embodiments in which the recoat head does not include IR lamps, valve 40*l* and flow meter 42*d* may be omitted. In embodiments, valve 40*l* is a pinch valve, although other types of valves are contemplated and possible. As described above, the use of a pinch valve enables the valve 40*l* to be precisely controlled to enable a predetermined flow rate. The flow rate may depend on, for example, the number of IR lamps positioned on the recoat head 140, the heat output by the IR lamps, or the like. In embodiments, the flow used for cooling the electronics is from about 10 CFM to about 15 CFM. In embodiments, the flow of the clean gas stream for cooling the IR lamps is from about 3 CFM to about 5 CFM per lamp.

Although the clean gas stream enters the process chamber 300 through the linear motion stage 420, the print head 150, and the recoat head 140, in embodiments, the plenum 416 also provides a separate flow of the clean gas stream to the process chamber 300. In embodiments, a flow meter 42*e* and valve 40*m* are positioned between the plenum 416 and the process chamber 300. Downstream from valve 40*m*, a valve 40*n* is included to enable or prevent a flow of the gas to the exhaust. In embodiments, one or both of valves 40*m* and 40*n* are throttling valves, although other types of valves are possible and contemplated. When both valves 40*m* and 40*n* are open, at least some of the clean gas stream from the plenum 416 exits the system through the valves. The remaining flow of the clean gas stream enters the process chamber 300 through an inlet.

FIGS. 4 and 5 further depict a mass flow controller 418 that controls a flow of fresh gas from inert pneumatics 422 and/or from non-inert pneumatics 424. In embodiments, the mass flow controller 418 controls the amount of fresh gas that is added to the clean gas stream flowing past the valve 40*m* and provided to the process chamber 300. Fresh gas may be added, for example, when the environment within the process chamber 300 is being transitioned to an inert environment, when the environment within the process chamber 300 is being transitioned to a non-inert environment, or when the clean gas stream arriving at the plenum 416 is insufficient to maintain the pressure within the closed-loop of the environmental system.

In various embodiments, the inlet to the process chamber 300 is coupled to a diffuser (not shown). Although other inlet structures are possible, the use of a diffuser can minimize the pressure drop and enable a uniform flow of gas into the process chamber, without adversely impacting the flow of gas directly above the powder bed. For example, in embodiments, the inlet to the process chamber 300 may be located vertically above the powder bed (e.g., in the +Z direction in FIG. 1) and sufficiently spaced away from the powder bed such that the velocity of gas flow within about 2 inches of the powder bed is less than about 1 meter per second (m/s). For example, in embodiments, the maximum velocity of the gas within 2 inches of the powder bed for a flow of gas (e.g., air or Argon) entering the chamber at 200 CFM-320 CFM is less than 1 m/s, less than 0.9 m/s, or less than 0.85 m/s. Additionally, in embodiments, the inlet to the process chamber 300 may be positioned toward one side of the process chamber 300 (e.g., over the cleaning station 110 in FIG. 1) to further separate the inlet flow from areas within the process chamber 300 where build material 400 is present. Although the location and form of the inlet can vary depending on the particular embodiment, in embodiments, the inlet is physically distanced from areas where build material 400 is present, which may reduce the amount of build material that is fluidized within the process chamber 300.

As shown in FIGS. 4 and 5, in embodiments, the process chamber 300 includes at least one sensor 44*g*. Although depicted in FIGS. 4 and 5 as a single sensor, in embodiments, sensor 44*g* can include, for example, one or more temperature sensors, one or more pressure sensors, one or more oxygen sensors, one or more humidity sensors, one or more VOC sensors, one or more LEL sensors, or any combinations thereof. In embodiments, the process chamber 300 includes at least a temperature sensor and a pressure sensor. In an embodiment, the process chamber 300 includes at least two pressure sensors, at least two oxygen sensors, four temperature sensors, and a humidity sensor, a VOC sensor, or an LEL sensor. The particular location of each of the sensors within the process chamber 300 can vary depending on the particular embodiment. For example, the location of the sensors within the process chamber 300 can vary depending on the number of sensors included, the type of sensors included, the sensitivity of the sensors included, or the like. In embodiments, the temperature sensor within the process chamber 300 is spaced apart from the powder bed by greater than about 2 inches.

In embodiments, sensor 44*g* can provide information regarding the environment within the process chamber 300 that can be used to change one or more parameters within the closed-loop environmental system 401, 501, such as may be needed to alter the environment within the process chamber 300. For example, according to embodiments, the process chamber 300 may be maintained at a temperature of from about 25° C. to about 40° C., or from 27° C. to about 35° C., a relative humidity of from about 15% to about 40%, and a pressure of from about 0 mbar to about 20 mbar. According to embodiments, the process chamber 300 may have an oxygen content of less than 2% by volume when in an inert state, and from about 15% to about 22% by volume when in a non-inert state. Although the particular operational parameters within the process chamber 300 may vary depending on the particular embodiments, it should be understood that the various component of the environmental system described herein operate together to achieve and maintain the particular operational parameters during the operation of the additive manufacturing apparatus. Such maintenance of the operational parameters, and thus, the environment within the process chamber 300, can be achieved, for example, through the use of the sensors 44 located at different locations along the closed-loop and the use of the information from the sensors 44 to adjust one or more of the valves 40 to control the flow of the gas to one or more of the components of the environmental system and/or to adjust an operational parameter of the blower 406, the concentrator 408, the condenser system 410, the heating coil 414, the dehumidifier 502, and/or the heat exchanger 504, depending on the particular embodiment. It should be understood that the receipt and processing of the information (e.g., data) from the sensors 44, and the determination of what adjustments to make within the environmental system 401, 501, can be performed by the control system 200 or by another computing device included as part of the additive manufacturing apparatus.

Moreover, in embodiments, information from one or more of the sensors 44 located at different locations along the closed-loop may be used to generate an alert regarding a status of the environmental system. For example, information from one of the sensors may first be used (e.g., by the control system 200) to adjust one or more of the valves to make an adjustment to the environmental system. Following the adjustment, if the information from the one or more sensors continues to indicate that the environmental system is outside of the predetermined range, the control system 200 may generate an alert, pause operation of the additive manufacturing apparatus, or the like.

In the embodiments shown in FIGS. 4 and 5, various sensors 44 and valves 40 were described. It is contemplated that, in embodiments, additional sensors 44 and valves 40 may be included throughout the environmental system depending on the particular embodiment. Moreover, in embodiments, one or more of the sensors 44 and valves 40 described in FIGS. 4 and 5 may be omitted. Sensors 44 and valves 40 may further be of other types than those described hereinabove. For example, valves 40 that have been described as being on/off valves can be throttle valves, and vice versa, and sensors 44 can include any one or more of the different types of sensors disclosed herein. In embodiments, the valves 40 are made of stainless steel and may be coupled with spring return actuators to control a fail position each of the valves 40. Moreover, in embodiments, one or more of the valves is coupled to a device (e.g., a position sensor) to provide feedback to the control system 200 on the position of the valve 40.

The closed-loop of the environmental system 401, 501 further includes tubing or piping fluidly coupling each component in the system to adjacent components. In embodiments, tubing can be made of stainless steel or another non-reactive material. Along with the valves 40, the tubing is sized to minimize pressure losses throughout the system. In embodiments, tubing sizing may also depend on, for example, flow rates for powder conveyance, embedded sensor/device selections, or the like.

Figure 6:
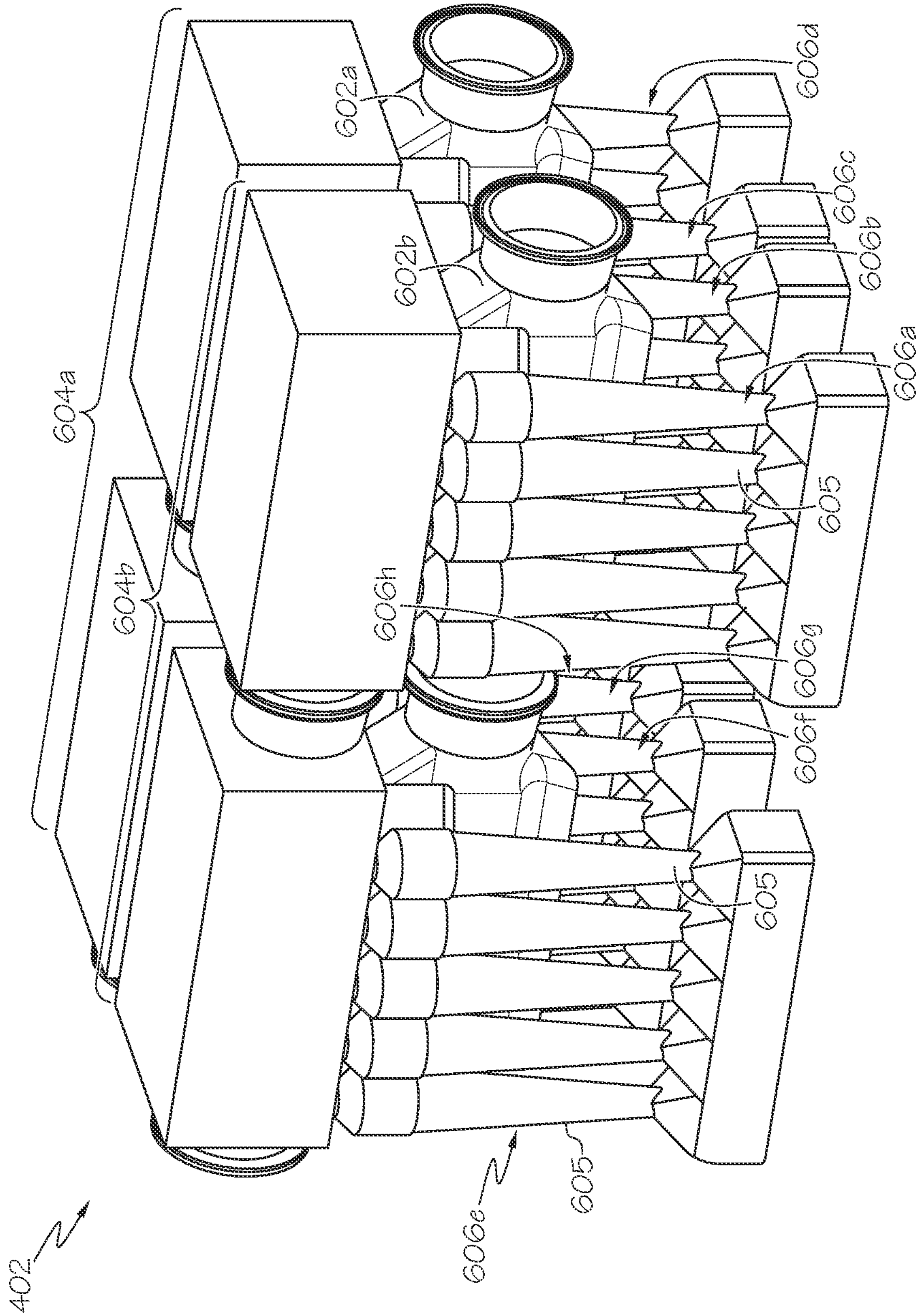
FIG. 6 schematically depicts an example particle separation system for use in an additive manufacturing apparatus according to one or more embodiments shown and described herein.
Figure 7:
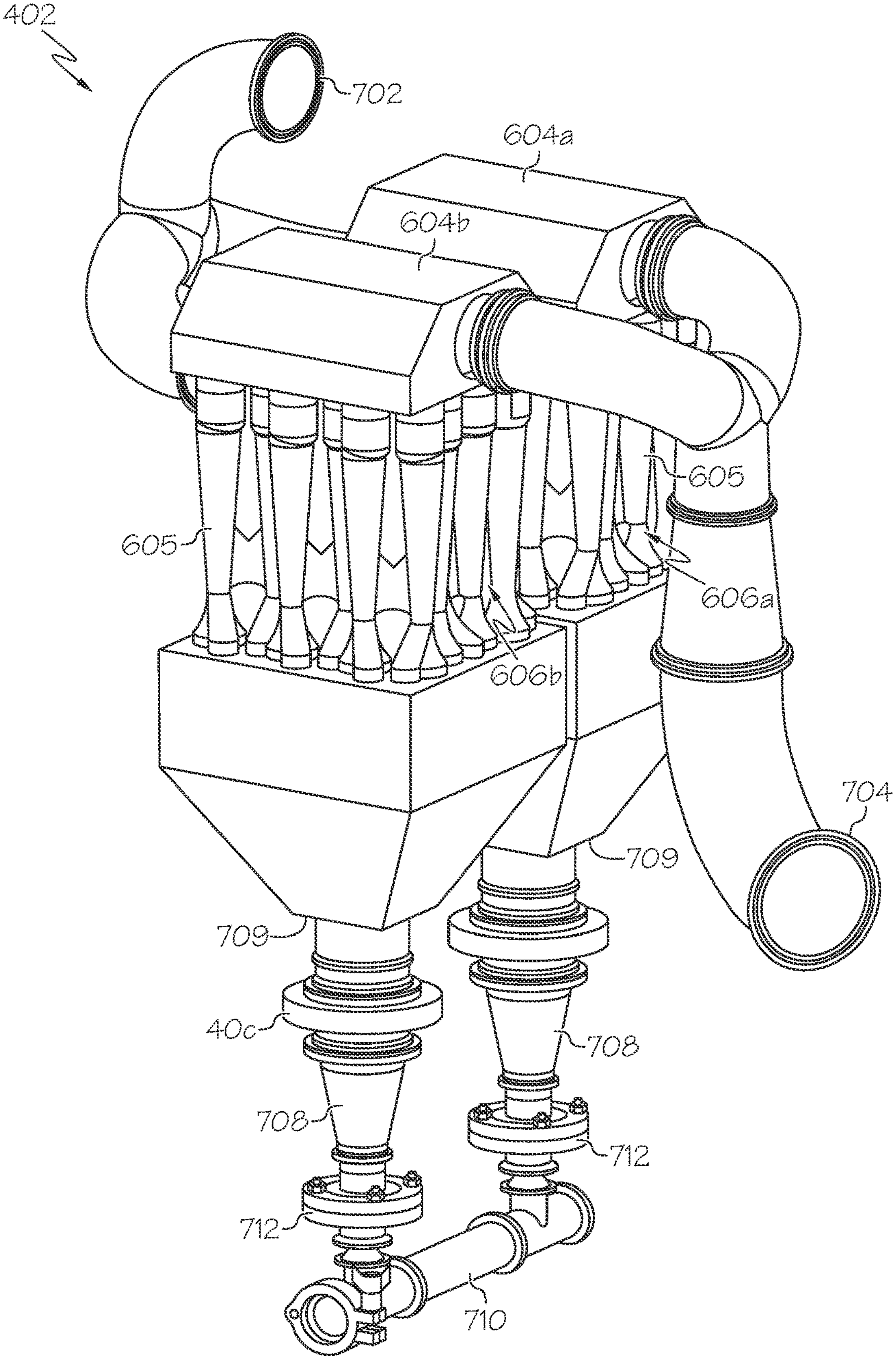
FIG. 7 schematically depicts another example particle separation system for use in an additive manufacturing apparatus according to one or more embodiments shown and described herein.

Turning now to FIGS. 6-7, various embodiments of a particle separation system 402 are shown. In FIGS. 6 and 7, the particle separation system 402 includes at least a first inlet manifold 602*a* and a second inlet manifold 602*b*. As described herein, inlet manifolds may generically and/or collectively be indicated by reference numeral 602, or may be specifically referred to by the reference numeral 602 followed by an alphabetic identifier. The embodiment in FIG. 6 includes two inlet manifolds, 602*a*, and 602*b*. The embodiment in FIG. 7 also includes two inlet manifolds 602*a* and 602*b*, although they are both obscured in FIG. 7 and not shown. It is contemplated that greater or fewer numbers of inlet manifolds can be included, depending on the particular embodiment. Moreover, although depicted in FIG. 6 as having a rectangular cross-section, it is contemplated that, in embodiments, the inlet manifolds 602 can have any shaped cross-section, provided a single manifold provides a flow of gas to multiple cyclones, as will be described in greater detail below, depending upon the flow rates and volumes expected, as well as plumbing aspects of connecting the particle separation system 402 to the incoming source of particle-laden stream and manufacturing considerations.

In various embodiments, the particle separation system 402 further comprises at least a first exhaust manifold 604*a* and a second exhaust manifold 604*b*. As described herein, exhaust manifolds may generically and/or collectively be indicated by reference numeral 604, or may be specifically referred to by the reference numeral 604 followed by an alphabetic identifier. The embodiments in FIGS. 6 and 7 each include two exhaust manifolds, 604*a* and 604*b*. It is contemplated that greater or fewer exhaust manifolds can be included, depending on the particular embodiment. In embodiments, the number of exhaust manifolds 604 is equal to the number of inlet manifolds 602. Moreover, although depicted in FIG. 6 as having a rectangular cross-section and in FIG. 7 as having a trapezoidal cross-section, it is contemplated that, in embodiments, the exhaust manifolds 604 can have any shaped cross-section, provided a single manifold receives a flow of gas from multiple cyclones, as will be described in greater detail below, depending upon the flow rates and volumes expected, as well as plumbing aspects of connecting the particle separation system 402 to the recipient of the reduced-particle stream and manufacturing considerations.

In embodiments, the inlet manifold 602 is located vertically below (e.g., in the −Z direction) the exhaust manifold 604. A plurality of cyclonic separators 605 are disposed between each inlet manifold 602 and a corresponding exhaust manifold 604 along a fluid flow path. In various embodiments, the plurality of cyclonic separators 605 are arranged in a plurality of arrays 606. As described herein, arrays may generically and/or collectively be indicated by reference numeral 606, or may be specifically referred to by the reference numeral 606 followed by an alphabetic identifier. The embodiment in FIG. 6 includes eight arrays, 606*a*, 606*b*, 606*c*, 606*d*, 606*e*, 606*f*, 606*g*, and 606*h*, with four arrays being positioned between each inlet manifold 602 and its corresponding exhaust manifold 604, while the embodiment in FIG. 7 includes two arrays 606*a* and 606*b*, with one array being positioned between each inlet manifold 602 and its corresponding exhaust manifold 604. In embodiments, each array 606 is a substantially linear arrangement of cyclonic separators 605 arranged along a length of the corresponding inlet manifold 602 and exhaust manifold 604. In FIG. 6, the cyclonic separators 605 in each array are arranged linearly, while in FIG. 7, the cyclonic separators 605 in each array are staggered along a linear axis. Other arrangements of cyclonic separators 605 within each array are contemplated, provided each cyclonic separator 605 is fluidly coupled to the inlet manifold 602 and the exhaust manifold 604.

In embodiments, the plurality of arrays 606 are arranged in parallel with respect to other arrays coupled to the corresponding inlet manifold 602 and exhaust manifold 604. For example, in FIG. 6, array 606*a* and array 606*b* are arranged in parallel with respect to the other. Similarly, in FIG. 7, array 606*a* and array 606*b* are arranged in parallel with respect to the other. The parallel arrangement of the arrays 606 with respect to the inlet manifold 602 and the exhaust manifold 604 enables multiple arrays 606 to receive an equal volume of the gaseous stream flowing through the inlet manifold 602. However, it is contemplated that, in embodiments, one or more arrays 606 may receive a different volume of the gaseous stream than other arrays 606.

It is contemplated that any number of inlet manifolds, outlet manifolds, and arrays of cyclonic separators can be included, depending on the particular embodiment. Moreover, it is contemplated that each array may include any number of individual cyclonic separators. For example, each array 606 may include greater than or equal to 5 cyclonic separators, greater than or equal to 6 cyclonic separators, greater than or equal to 8 cyclonic separators, greater than or equal to 10 cyclonic separators, greater than or equal to 12 cyclonic separators, or greater than or equal to 15 cyclonic separators. In embodiments, the total number of cyclonic separators in the particle separation system is greater than or equal to 12, greater than or equal to 15, greater than or equal to 18, greater than or equal to 20, or even greater than or equal to 25 cyclonic separators. The number of total cyclonic separators included in the particle separation system 402 may vary depending on, for example, the allowable pressure drop over the particle separation system, target particle size to separate, and manufacturing and dimensional considerations of the additive manufacturing apparatus 100. For example, as will be described in greater detail below, although an increased number of cyclonic separators may be desired to reduce the pressure drop, spatial considerations may limit the number that can be included in practice. In embodiments, each of the plurality of cyclonic separators receives a substantially equal volume of the gaseous stream.

Figure 8:
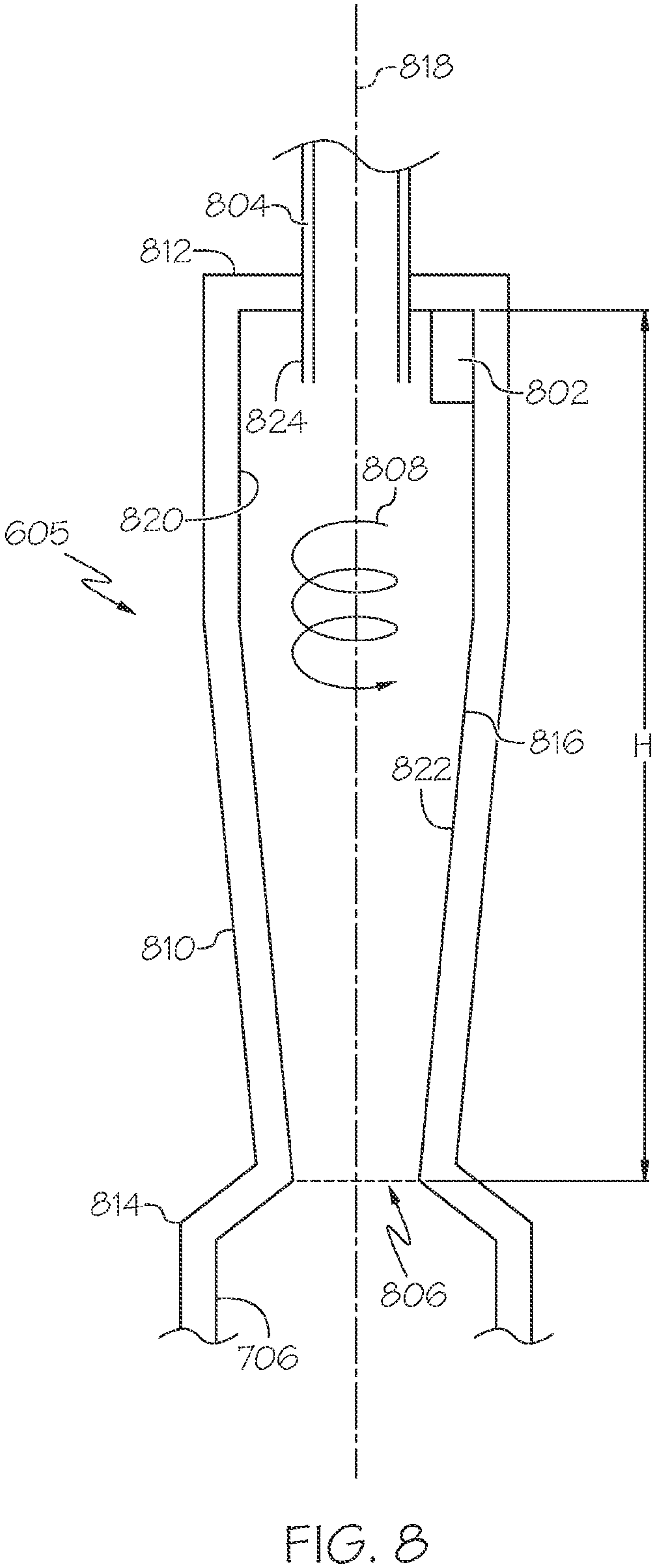
FIG. 8 schematically depicts a cross-section of a cyclonic separator for use in a particle separation system according to one or more embodiments shown and described herein.

FIG. 8 is a cross-sectional view of one embodiment of a cyclonic separator 605 suitable for use in particle separation system 402 described herein. As shown in FIG. 8, each cyclonic separator 605 includes one or more inlets 802 for a particle laden flow, an outlet 804 for a reduced-particle stream, a particle outlet 806, and an internal separation chamber 808 bounded by a separator body 810. Separator body 810 has a first end 812, a second end 814, and a peripheral wall 816 extending therebetween. Peripheral wall 816 has an axisymmetric shape and defines a separation chamber 808 having a centerline axis 818. A particle collection container 706 is provided to collect separated particles for eventual disposal and to provide closure to the second end 814 of the cyclonic separator 605. As shown in FIG. 7, the particle collection container 706 is a common particle collection container 706 shared by the various cyclonic separators 605 in an array 606, and in embodiments, multiple arrays 606. Axisymmetric shapes for the peripheral wall 816 include cylindrical, frusto-conical, and other shapes of revolution. Although described herein as a cyclonic separator 605, other types of separators could be utilized in the particle separation systems 402 described herein.

Also illustrated in FIG. 8 is the axisymmetric shape of the peripheral wall 816 of the separator body 810, the interior surface of which defines the separation chamber 808. In the embodiment shown, the peripheral wall has a cylindrical portion 820 and a conical or frusto-conical portion 822. This provides a tapered, converging shape to the separation chamber 808 which accelerates the circulation flow of the incoming, particle-laden stream to enhance the separation of particles.

With reference to FIGS. 6-8, in operation, all of the incoming particle-laden stream enters the particle separation system 402 through a common fluid inlet 702, as shown in FIG. 7. Although the fluid inlet 702 is not shown in FIG. 6, it is contemplated that the fluid inlet can be coupled to the particle separation system of FIG. 6 in a manner similar as is shown in FIG. 7. The fluid inlet 702, for example, may be coupled to tubing or piping to receive the particle-laden stream from the process chamber 300 and the recoat head 140, as shown in FIGS. 4 and 5. The fluid inlet 702 is in fluid communication with the inlet manifolds 602 and, in embodiments, the flow of the particle-laden stream is divided in the fluid inlet 702 to provide a flow through each of the inlet manifolds 602. In particular, a volume of the particle-laden stream flows into the each of inlet manifold 602. A portion of the volume of particle-laden stream enters each of the cyclonic separators 605 from the corresponding inlet manifold 602 or other source through inlet 802. In embodiments, the inlet 802 may take the form of a spiral (planar) inlet tangent to the inner cylindrical wall of the separator body 810. Other inlet configurations (e.g., helical inlets) can be used, depending on the particular embodiment. In embodiments, the velocity of the particle-laden stream at the inlet is greater than or equal to 5 m/s, greater than or equal to 10 m/s, greater than or equal to 12 m/s, or greater than or equal to 15 m/s. In embodiments, the velocity of the particle-laden stream at the inlet is from 5 m/s to 20 m/s. The incoming flow then enters the separation chamber 808 near, or adjacent to, the first end 812 of the separator body 810. The flow of particle-laden stream P enters from the inlet 802 into the page across the back of the separation chamber then begins to circle the inside of the separation chamber 808 in a helical path and then gradually moves toward the second end 814 of the separator body, spurred onward by the continuous flow of incoming air. This helical flow pattern tends to force suspended particles radially outward toward the wall of the separation chamber 808.

In the configuration shown in FIG. 8, the separation chamber 808 includes a cylindrical portion 820 near the first end 812 of the separator body 810 and a tapered, conical portion 822 near the second end 814 of the separator body 810. The tapering of the separation chamber 808 through use of a conical portion 822 aids in accelerating the flow and directing suspended particles radially outward toward the wall of the separation chamber 808. Since the outlet 804 is near the first end 812, the airflow circulating within the separation chamber 808 eventually reaches the second end 814 and turns toward the first end 812. Suspended particles which are cast radially outward toward the peripheral wall of the separation chamber 808 are unable to make the turn toward the outlet 804 and thus fall out of suspension and are deposited into the particle collection container 706, which encloses the second end 814 of the separator body 810, as can be seen in FIG. 7. A vortex finder 824 extends axially inwardly from the outlet 804 and aids in maintaining a separation between incoming flow from the inlet 802 and outgoing flow through the outlet 804.

In the embodiment in FIG. 8, the outlet 804 may be oriented vertically upwardly, that is to say, in a direction opposite the force of gravity, to take advantage of the force of gravity in directing separated particles into the particle collection container 706. However, depending upon plumbing and other installation considerations, it may be desirable in some circumstances to orient the cyclonic separator 605 at an angle other than vertical and with the outlet 804 in a position other than vertically upwardly.

A volume of a reduced-particle stream flows from the cyclonic separator 605 through the outlet 804 to the exhaust manifold 604, which collects the volumes reduced-particle stream from the cyclonic separators 605 in one or more of the arrays 606. From the exhaust manifold 604, the volumes of the reduced-particle stream leaves the cyclonic separator 605, flowing to the fluid outlet 704. As with the fluid inlet 702, the fluid outlet 704 has been omitted in FIG. 6, although it should be understood that the fluid outlet 704 can be coupled to the particle separation system 402 of FIG. 6 in a manner similar that which is depicted in FIG. 7. The volumes of the reduced-particle stream from various exhaust manifolds 604 are combined in the fluid outlet 704, which provides the reduced-particle stream to the next component in the environmental system, such as the filter 404.

As described hereinabove, the particular particle separation system 402 that is used in an environmental system can vary depending on the particular system requirements. In embodiments, the particle separation system 402 is selected at least in part based on a pressure drop across the particle separation system and/or a cut size of the particle separation system 402. As used herein, the term "pressure drop" refers to the static pressure drop, or the drop in static pressure over the particle separation system for the same gas content, heat absorption, and blower speed. As described herein above, in operation, the pressure drop over the particle separation system 402 can be obtained by comparing a measured pressure of the particle-laden stream directly upstream of the particle separation system 402 (e.g., using sensor 44*a*) with a measured static pressure of the reduced-particle stream directly downstream of the particle separation system (e.g., using sensor 44*b*). In embodiments, the pressure drop is measured using a flow of 230 CFM of air or $N_2$ gas. In embodiments, the particle separation system 402 has a maximum pressure drop of less than or equal to 1.5 psi, less than or equal to 1.0 psi, less than or equal to 0.5 psi, or less than or equal to 0.3 psi. In embodiments, the particle separation system 402 has a maximum pressure drop of from about 0.5 psi to about 0.3 psi. Greater pressure drops are contemplated and possible, depending on other components within the environmental system.

In some embodiments, the pressure drop over the particle separation system is less than or equal to about 30%, less than or equal to about 25%, or less than or equal to about 20% of a maximum pressure drop tolerated by the blower. In embodiments, the particle separation system has an airwattage of less than about 200 Air Watts (AW), less than about 195 AW, or less than about 190 AW, as measured in accordance with ASTM F558-13.

Among other parameters that can be used to control pressure drop, it is believed that an increase in the total number of cyclonic separators 605 in the particle separation system 402 can reduce the pressure drop, as can increasing the ratio of the total height (H) of the cyclonic separator 605 measured from the first end 812 within the separation chamber 808 to the narrowest diameter within the separation chamber 808 to the diameter (D) of the cylindrical portion 820 (e.g., H/D). In embodiments, the ratio of H/D is greater than or equal to 4.0, greater than or equal to 4.1, greater than or equal to 4.2, greater than or equal to 4.3, greater than or equal to 4.4, or greater than or equal to 4.5. In embodiments, the height H of each cyclonic separator 605 is less than or equal to 1.0 m, less than or equal to 0.9 m, less than or equal to 0.8 m, less than or equal to 0.7 m, less than or equal to 0.6 m, less than or equal to 0.5 m, or less than or equal to 0.4 m. In embodiments, the height H of each cyclonic separator is greater than or equal to 0.1 m, greater than or equal to 0.2 m, greater than or equal to 0.3 m, or greater than or equal to 0.4 m. In embodiments, the diameter (D) is less than or equal to 0.25 m, less than or equal to 0.2 m, less than or equal to 0.15 m, or less than or equal to 0.1 m. In embodiments, the diameter (D) is greater than or equal to 0.05 m, greater than or equal to 0.1 m, greater than or equal to 0.15 m, or greater than or equal to 0.2 m.

As used herein, the term "cut size" refers to the particle size that is separated with a fractional efficiency of 0.5. In embodiments, the particle separation system 402 has a cut size of 5 μm or larger. In other words, in embodiments, the particle separation system 402 separates out greater than 95%, greater than 99%, or even greater than 99.5% of particles having a particle size of 5 μm or greater. In embodiments, the particle separation system 402 has a cut size of 3.5 μm or larger. In other words, in embodiments, the particle separation system 402 separates out greater than 95%, greater than 99%, or even greater than 99.5% of particles having a particle size of 3.5 μm or greater. In embodiments, the particle separation system 402 has a cut size of 1 μm or larger, as calculated using the Muschelknautz Method. In other words, in embodiments, the particle separation system 402 separates out greater than 95%, greater than 99%, or even greater than 99.5% of particles having a particle size of 1 μm or greater. Other cut sizes are contemplated and possible, and can vary depending on, for example, the build material 400 to be used in the additive manufacturing apparatus 100. In embodiments, the cut size can be determined by comparing the particle size distribution of particles entering the particle separation system 402 and exiting the particle separation system 402 (e.g., determining the particle size distribution of particles passing through the particle separation system 402). Particle size distribution can be measured using light scattering methods in accordance with ASTM B822. Particle size distribution can be measured using, for example, a S3500 Particle Size Analyzer available from Microtrac Inc. (Montgomeryville, PA).

As described above, particles separated from the gas flow by the particle separation system 402 are collected in a particle collection container 706 (omitted in FIG. 6). As shown in FIG. 7, multiple cyclonic separators 605 are coupled to a common particle collection container 706. In embodiments, the cyclonic separators 605 for one or more arrays 606 may be coupled to a common particle collection container 706. Moreover, each particle separation system 402 can include one or more particle collection containers 706. For example, as shown in FIG. 7, the particle separation system 402 includes two particle collection containers 706, although in embodiments, a single particle collection container can be used, or three or more particle collection containers 706 can be used. Although including additional particle collection containers can limit the number of cyclonic separators 605 coupled to each particle collection container, thereby reducing "cross-talk," it should also be understood that additional particle collection containers results in a greater number of valves and actuators, and can increase the complexity of the control thereof, as will be described in greater detail below.

In various embodiments, the particle separation system 402 can be manufactured using an additive manufacturing process, such as that performed by additive manufacturing apparatus 100. The use of an additive manufacturing process can enable a greater number of cyclonic separators 605 and more complex flow paths to be incorporated into the particle separation system 402. Other advantages can be realized by printing the particle separation system 402 using an additive manufacturing process.

In embodiments, the particle collection container 706 has at least one angled surface to guide the particles toward an outlet 709 of the particle collection container 706. Other shapes for the particle collection container 706 are contemplated and possible, provided the particle collection container 706 is capable of holding a volume of particles. In embodiments, the volume within the particle collection container 706 is greater than or equal to about 10% of a volume of build material used by the additive manufacturing apparatus for a complete build. In embodiments, the outlet 709 of the particle collection container 706 is located in a bottom surface of the particle collection container 706, although other arrangements are possible and contemplated. The outlet 709 couples the particle collection container 706 to the valve 40*c*, which is operable to enable the particles to be returned to a material handling system, such as material handling system 403 in FIGS. 4 and 5.

In embodiments, valve 40*c* is coupled to an actuator (not shown) that is configured to move the valve 40*c* between an open state in which particles flow through the valve 40*c*, and a closed state in which particles are prevented from flowing through the valve 40*c*. When the valve 40*c* is closed, particles can collect in the particle collection container 706.

In FIG. 7, particle collection container 706 is fluidly coupled to a conduit 708 through valve 40*c*. In embodiments, the conduit 708 extends between the valve 40*c* and a valve 712. In embodiments, the conduit 708 has a first diameter proximate the valve 40*c* that is greater than a second diameter proximate the valve 712. Accordingly, in embodiments, the conduit 708 decreases in diameter along its length between the valve 40*c* and the valve 712. However, it is contemplated that, in some embodiments, the conduit 708 may have a substantially constant volume.

In embodiments, the valve 712 is coupled to an actuator (not shown) that is configured to move the valve 712 between an open state in which particles flow through the valve 712, and a closed state in which particles are prevented from flowing through the valve 712. When the valve 712 is closed, particles entering the conduit 708 through the valve 712 collect in the conduit 708.

Conduit 708 is fluidly coupled to a particle conveyor 710 through the valve 712. In embodiments, together with the particle separation system 402, the particle conveyor 710 may form a particle handling system. In embodiments, the particle conveyor 710 is a tube or pipe through which a fluidizing stream of gas flows. In embodiments, the fluidizing stream of gas entrains the particles entering the particle conveyor 710 and carries them to the material handling system 403. In some embodiments, the return of the particles to the material handling system 403 from the particle separation system 402 can be conducted during normal operation of the additive manufacturing apparatus 100 (e.g., while an object is being built) without creating a drop in pressure due at least in part to the valves 40*c* and 712.

For example, in embodiments, the valves 40*c* and 712 can be operated (e.g., through their corresponding actuators) to create a pressure lock between the particle separation system 402 and the particle conveyor 710. Operation of the valves 40*c* and 712, and their corresponding actuators, can be controlled, for example, by control system 200, shown in FIG. 2, or by another computing device communicatively coupled to the actuators and valves. Assume that the additive manufacturing apparatus 100 is building an object, as described hereinabove. Furthermore, assume that the valves 40*c* and 712 are in a closed position, such that there is no flow of particles between the particle collection container 706 and the conduit 708 and there is no flow of particle between the conduit 708 and the particle conveyor 710. Accordingly, the conduit 708 is fluidly isolated from the particle collection container 706 and the particle conveyor 710. A gas stream is directed through the particle conveyor that is downstream from the particle separation system 402. During operation of the additive manufacturing apparatus, a particle-laden stream is directed into the plurality of cyclonic separators 605, as described in greater detail hereinabove. In particular, the particle-laden stream is directed into the plurality of cyclonic separators 605 through the fluid inlet 702 and the inlet manifold 602. At least some particles are separated from the particle-laden stream to produce a reduced-particle stream, which is directed out of the particle separation system 402 through the exhaust manifold 604 and the fluid outlet 704. The at least some particles that are separated from the particle-laden stream are directed to the particle collection container 706, as described in detail above. With the valve 40*c* in the closed position, particles accumulate within the particle collection container 706.

In embodiments, the valve 40*c* is opened to fluidly couple the particle collection container 706 with the conduit 708 and enable the particles to flow from the collection container into the conduit 708. In embodiments, the conduit 708 is vertically below the valve 40*c* such that gravity assists with the flow of the particles from the particle collection container 706 to the conduit 708. With the valve 712 closed, particles accumulate within the conduit 708.

After a volume of particles has accumulated within the conduit 708, the valve 40*c* is closed, fluidly isolating the particle collection container 706 from the conduit 708. Particles from the particle separation system 402 again accumulate within the particle collection container 706 as operation of the additive manufacturing apparatus continues. Once the valve 40*c* is closed, the valve 712 is opened to enable the particles in the conduit to enter the gas stream of the particle conveyor 710. In various embodiments, the valve 40*c* is closed and the valve 712 is opened during the directing of a particle-laden stream into the plurality of cyclonic separators 605. In other words, the particle separation system 402 is in continual operation during the flowing of the particles from the conduit 708 to the particle conveyor 710.

In embodiments, the valve 712 remains in the open position until the conduit 708 is empty and the particles previously collected in the conduit 708 have passed into the gas stream passing through the particle conveyor 710. Once the conduit 708 is empty, the valve 712 is closed. The valve 40*c* may then again be opened to enable additional particles from the particle collection container 706 to flow into the conduit 708. In various embodiments, the valve 712 is closed and the valve 40*c* is opened during the directing of a particle-laden stream into the plurality of cyclonic separators 605. In other words, the particle separation system 402 is in continual operation during the flowing of the particles from the particle collection container 706 into the conduit 708.

Although the particle separation system 402 is in continual operation during the flowing of the particles from the particle collection container into the conduit 708 and from the conduit 708 into the particle conveyor 710, it should be understood that, in various embodiments, at least one of the valve 40*c* and the valve 712 is closed during the directing of the particle-laden stream into the plurality of cyclonic separators 605. In other words, at least one of the valves 40*c* and 712 remains closed to fluidly isolate the particle separation system 402, and specifically the plurality of cyclonic separators 605, from the particle conveyor 710. The fluid isolation of the particle separation system 402 from the particle conveyor 710 maintains the pressure within the particle separation system 402, and accordingly, within the environmental system.

Having described an additive manufacturing apparatus including an environmental system in detail, it should be appreciated that, in embodiments, the environmental system can be used to enable or improve operation of the additive manufacturing apparatus. In particular, when the environmental system of various embodiments described herein is incorporated into an additive manufacturing apparatus, the environmental system can establish and maintain a stable environment, including an inert environment, which, in turn, can enable the additive manufacturing apparatus to be used in conjunction with chemically reactive build materials, for example. For example, in embodiments, the environmental systems described herein enable the environment within the process chamber to be carefully controlled during operation of the additive manufacturing apparatus.

In embodiments, the additive manufacturing apparatus, and, specifically, the environmental system, can be operated to convert an environment within the process chamber from a non-inert environment to an inert environment. In such embodiments, the method includes powering down selected electrical components within the additive manufacturing system. The selected electrical components can include, for example, electrical components that are not certified for use in hazardous environment. These electrical components can include, by way of example and not limitation, non-Atex electrical components that operate at greater than or equal to about 5V and are located within the process chamber.

Next, the method includes adding a reactive powder to a powder supply of the additive manufacturing system. For example, a titanium or aluminum powder may be added to the build supply platform or a hopper coupled to the recoat head 140. In embodiments, the reactive powder can be supplied to the build supply platform or hopper by a material handling system, such as the material handling system 403.

The method further includes opening at least one valve in the environmental system of the additive manufacturing system to enable gas to be exhausted from the environmental system. In embodiments, the valve 40*n* (FIGS. 4 and 5) may be opened to enable gas to be exhausted from the environmental system.

Next, the method includes isolating the process chamber within the additive manufacturing system from the environment surrounding the process chamber. In embodiments, for example, interlocks surrounding the process chamber can be engaged to seal the process chamber.

Once the process chamber is sealed, an inert gas may be introduced into the process chamber. For example, the mass flow controller 418 may enable a flow of fresh gas from the inert pneumatics 422 to provide a flow of inert gas (e.g., nitrogen or argon) to the process chamber. In embodiments, the flow of inert gas may be provided at a low speed, such as from about 5 to about 10 CFM.

In various embodiments, the blower 406 is activated to reduce the oxygen content within the environmental system. For example, the blower may be operated at a speed of less than or equal to about 50 CFM to circulate the gas within the environmental system. In embodiments, the blower 406 and the inert pneumatics 422 are operated in this fashion until all oxygen sensors within the environmental system indicate that the oxygen content within the environmental system is less than or equal to a predetermined threshold amount for the particular reactive powder. For example, in embodiments, the blower 406 and inert pneumatics 422 are operated until the oxygen content throughout the environmental system is less than about 2% by volume. Put another way, in embodiments, information regarding the oxygen content within the environmental control system is received from an oxygen sensor within the environmental control system. Responsive to determining that the oxygen content within the environmental control system is below a threshold value, at least one valve (e.g., valve 40*n*) is closed.

In embodiments, the oxygen content within the process chamber is maintained. For example, when the desired oxygen content is reached, in embodiments, the exhaust valve (e.g., valve 40*n*) may be closed to prevent gas from leaving the environmental system.

Finally, the inlet of the inert gas (e.g., the inert pneumatics) and one valve (e.g., valve 40*n*) within the environmental system are modulated to obtain a predetermined pressure within the process chamber.

Once the environment within the process chamber is at the desired oxygen content and pressure, the additive manufacturing apparatus may be operated to deposit a layer of the reactive powder on a build surface within the process chamber with a recoat head; and selectively jet a binder fluid onto the layer of the reactive powder to fuse a layer of a three-dimensional object. In embodiments, the electrical components that were powered down at the beginning of the inertization process (e.g., the non-Atex components) may be powered up when the process chamber is at the desired oxygen content and pressure. The speed of the blower 406 may be increased to about 150 CFM or 200 CFM or greater. Other speeds may be suitable, provided the speed of the blower is capable of maintaining the desired environment within the process chamber 300. In embodiments, one or more oxygen sensors positioned within the environmental system can be used to monitor the oxygen content throughout the environmental system. It should be appreciated that, during operation of the additive manufacturing apparatus to build the three-dimensional object, the control system (e.g., control system 200) can adjust various valves and/or parameters of one or more components within the environmental system (e.g., the blower, the condenser, the heat exchanger, etc.) to maintain the vapor content, temperature, and oxygen content within the environment within the process chamber.

In embodiments, when the additive manufacturing machine is in an inert state (e.g., the environment within the process chamber is an inert environment), components within the environmental system can be operated to convert the environment within the process chamber to a non-inert environment. For example, in embodiments, selected electrical components (e.g., the non-Atex components described above) are powered down, at least one valve in the environmental system is opened to enable the gas to be exhausted, and the non-inert pneumatics 424 are used to pump non-inert gas into the process chamber. In some embodiments, after a build has been completed in an inert environment, the blower may be run for several minutes to ensure that the gas within the environmental system has been completely filtered, thereby ensuring that reactive powder is not exhausted into the environment around the additive manufacturing apparatus. As in the inertization process, the non-inert pneumatics and the blower are operated to flow non-inert gas into the process chamber and the environmental system until a predetermined oxygen content is reached.

In the embodiments described herein, a number of components are described as being included in the environmental system. It is contemplated that additional, or fewer, components can be included, provided that the environment within the process chamber can be controlled within predetermined tolerances, such as may be required by other components within the additive manufacturing apparatus, by the build material, or to achieve particular qualities of the three-dimensional objects built by the additive manufacturing apparatus. Accordingly, it should be appreciated that different types of valves and sensors can be used, and that the sensors, valves, and components described herein may be located in various positions throughout the environmental system.

Based on the foregoing, it should be understood that various embodiments of environmental systems and additive manufacturing apparatuses including the same can enable an additive manufacturing apparatus to print using both reactive and non-reactive materials, and operate in an inert and non-inert environment. Moreover, various embodiments described herein enable build material to be captured and recycled, and enable gas in the environmental system to be recirculated to reduce operational costs. Other advantages can be realized depending on the particular embodiment selected.

Further aspects of the invention are provided by the subject matter of the following clauses:

1. An additive manufacturing apparatus comprising: a process chamber surrounding a print head, a recoat head, and a linear motion stage to which the print head and the recoat head are coupled, wherein the print head and recoat head operate within the process chamber to build a three-dimensional object by depositing a build material and a binder material; a condenser system fluidly coupled to the process chamber to receive a gas stream with a first vapor content from the process chamber and provide the gas stream with a second vapor content to the process chamber, wherein the second vapor content is less than the first vapor content; and a blower fluidly coupled to the process chamber and the condenser system to flow the gas stream through a closed loop comprising the blower, the process chamber, and the condenser system.

2. An additive manufacturing apparatus according to any preceding clause, further comprising: a concentrator fluidly coupled to the condenser system and the process chamber.

3. An additive manufacturing apparatus according to any preceding clause, further comprising: a volatile organic compound (VOC) sensor along a flow path of the gas stream through the closed loop.

4. An additive manufacturing apparatus according to any preceding clause, further comprising: a lower explosive limit (LEL) sensor along a flow path of the gas stream through the closed loop.

5. An additive manufacturing apparatus according to any preceding clause, further comprising: a particle separation system positioned within the closed loop to receive the gas stream from the process chamber and provide the gas stream to the blower, wherein the particle separation system is configured to remove particles from the gas stream.

6. An additive manufacturing apparatus according to any preceding clause, wherein the particle separation system comprises a plurality of cyclonic separators arranged in a plurality of arrays.

7. An additive manufacturing apparatus according to any preceding clause, wherein the plurality of cyclonic separators comprises greater than or equal to 12 cyclonic separators.

8. An additive manufacturing apparatus according to any preceding clause, wherein a pressure drop over the particle separation system is less than about 1.5 psi as measured using a flow of 230 CFM of air or $N_2$ gas.

9. An additive manufacturing apparatus comprising: a process chamber surrounding a print head, a recoat head, and a linear motion stage to which the print head and the recoat head are coupled, wherein the print head and recoat head operate within the process chamber to build a three-dimensional object by depositing a build material and a binder material; a first plurality of sensors positioned within the process chamber, wherein the first plurality of sensors comprises at least a temperature sensor and a pressure sensor; a particle separation system fluidly coupled to the process chamber to receive a particle-laden stream from the process chamber, wherein the particle separation system separates at least some particles out from the particle-laden stream to produce a reduced-particle stream; a filter fluidly coupled to the particle separation system to receive the reduced-particle stream from the particle separation system, wherein the filter removes additional particles from the reduced-particle stream to provide a clean gas stream; a blower receiving the clean gas stream; a temperature control unit for cooling the clean gas stream; a condenser system; and a second plurality of sensors positioned external to the process chamber and after the particle separation system, the filter, the blower, the temperature control unit, and the condenser system and before the process chamber along a fluid recirculation path, wherein the second plurality of sensors comprises at least a temperature sensor, a pressure sensor, and one or more of a volatile organic compound (VOC) sensor, a lower explosive limit (LEL) sensor, a humidity sensor, and a vapor sensor; wherein the process chamber, the particle separation system, the filter, the blower, the condenser system, and the temperature control unit form a closed loop.

10. An additive manufacturing apparatus according to any preceding clause, wherein the filter is a high efficiency particulate air (HEPA) filter.

11. An additive manufacturing apparatus according to any preceding clause, further comprising a first valve positioned between the particle separation system and the filter and a second valve positioned between the filter and the blower along the fluid recirculation path, wherein closing the first valve and the second valve fluidly isolates the filter from the closed loop.

12. An additive manufacturing apparatus according to any preceding clause, wherein the condenser system is positioned after the pump and before the process chamber along the fluid recirculation path.

13. An additive manufacturing apparatus according to any preceding clause, wherein temperature control unit comprises a heat exchanger, and the condenser system passes the clean gas stream to the heat exchanger.

14. An additive manufacturing apparatus according to any preceding clause, further comprising a valve to enable the condenser system to be bypassed along the fluid recirculation path.

15. An additive manufacturing apparatus according to any preceding clause, wherein the clean gas stream comprises an inert gas.

16. An additive manufacturing apparatus according to any preceding clause, wherein an environment within the process chamber is inert.

17. An additive manufacturing apparatus according to any preceding clause, wherein the process chamber comprises an inlet diffuser through which the clean gas stream enters the process chamber, wherein the inlet diffuser reduces a flow velocity of the clean gas stream.

18. A method of controlling an environment within a process chamber, the method comprising: receiving, information regarding a temperature, a pressure, and a vapor content within the process chamber from at least one sensor located within the process chamber; removing a particle-laden stream from the process chamber; separating particles from the particle-laden stream to provide a clean gas stream; reducing a temperature, a vapor content, or both of the clean gas stream based on the received information to achieve a predetermined temperature, pressure, and vapor content within the process chamber; and pumping the clean gas stream into the process chamber.

19. A method according to any preceding clause, wherein separating the particles from the particle-laden stream comprises directing the particle-laden stream through a particle separation system, a HEPA filter, or both.

20. A method according to any preceding clause, further comprising: receiving, from a pressure sensor positioned external to the process chamber, information regarding a pressure of the clean gas stream; and identifying an error at the particle separation system, the HEPA filter, or both, based on a difference between the pressure of the clean gas stream and the pressure within the process chamber.

21. A method according to any preceding clause, wherein the clean gas stream is substantially free of oxygen.

22. A method according to any preceding clause, wherein removing the particle-laden stream from the process chamber comprises removing the particle-laden stream through an outlet port in the process chamber.

23. A method according to any preceding clause, wherein removing the particle-laden stream from the process chamber comprises removing the particle-laden stream through a recoat head operating within the process chamber.

24. A method according to any preceding clause, further comprising: receiving, from a humidity sensor positioned between the process chamber and a dehumidifier, information regarding a humidity level of the clean gas stream; and actuating at least one valve based on the information regarding the humidity level within the process chamber received from the humidity sensor positioned within the process chamber and the humidity level of the clean gas stream to enable the clean gas stream to bypass the dehumidifier.

25. A method according to any preceding clause, wherein pumping the clean gas stream into the process chamber comprises: actuating a throttling valve to allow a predetermined volume of the clean gas stream to enter the process chamber.

26. A method of operating an additive manufacturing system, the method comprising: powering down selected electrical components within the additive manufacturing system; adding a reactive powder to a powder supply of the additive manufacturing system; opening at least one valve in an environmental control system of the additive manufacturing system to enable gas to be exhausted from the environmental control system; isolating a process chamber within the additive manufacturing system from an environment surrounding the process chamber; introducing an inert gas into the process chamber; activating a blower in the environmental control system to reduce an oxygen content within the environmental control system; and modulating an inlet of the inert gas and the at least one valve to obtain a predetermined pressure within the process chamber.

27. A method according to any preceding clause, further comprising: receiving, from an oxygen sensor within the environmental control system, information regarding the oxygen content within the environmental control system; and responsive to determining that the oxygen content within the environmental control system is below a threshold value, closing the at least one valve.

28. A method according to any preceding clause, wherein the selected electrical components comprise electrical components that are not certified for use in hazardous environment.

29. A method according to any preceding clause, further comprising: receiving, from an oxygen sensor positioned within the process chamber, information regarding an oxygen content within the process chamber; and maintaining the oxygen content within the process chamber.

30. A method according to any preceding clause, further comprising: depositing a layer of the reactive powder on a build surface within the process chamber with a recoat head; and selectively jetting a binder fluid onto the layer of the reactive powder to fuse a layer of a three-dimensional object.

31. A particulate separation system for removing particles from a gaseous stream, the particulate separation system comprising: an inlet manifold; an exhaust manifold; a fluid inlet in fluid communication with the inlet manifold; a fluid outlet in fluid communication with the exhaust manifold; and a plurality of cyclonic separators comprising at least one array of cyclonic separators disposed between the inlet manifold and the exhaust manifold.

32. A particulate separation system for removing particles from a gaseous stream, the particulate separation system comprising: a first inlet manifold and a second inlet manifold; a first exhaust manifold and a second exhaust manifold; a fluid inlet in fluid communication with the first inlet manifold and the second inlet manifold; a fluid outlet in fluid communication with the first exhaust manifold and the second exhaust manifold; and a plurality of cyclonic separators comprising a first array of cyclonic separators and a second array of cyclonic separators, the first array of cyclonic separators disposed between the first inlet manifold and the first exhaust manifold and the second array of cyclonic separators disposed between the second inlet manifold and the second exhaust manifold.

33. A particulate separation system according to any preceding clause, wherein each of the plurality of cyclonic separators receives an equal volume of the gaseous stream.

34. A particulate separation system according to any preceding clause, wherein the plurality of cyclonic separators produces a reduced particle stream and delivers the reduced particle stream to the fluid outlet.

35. A particulate separation system according to any preceding clause, wherein the first array of cyclonic separators and the second array of cyclonic separators are arranged in parallel.

36. A particulate separation system according to any preceding clause, further comprising a collection container, wherein the plurality of cyclonic separators delivers particles to the collection container.

37. A particulate separation system according to any preceding clause, further comprising a conduit and a first valve, wherein the collection container is fluidly coupled to the conduit via the first valve.

38. A particulate handling system comprising the particulate separation system of any preceding clause and a particulate conveyor, wherein the conduit is fluidly coupled to the particulate conveyor via a second valve.

39. A particulate handling system according to any preceding clause, further comprising a first collection container and a second collection container, wherein the first array of cyclonic separators delivers particles to the first collection container and the second array of cyclonic separators delivers particles to the second collection container.

40. A particulate separation system according to any preceding clause, wherein a pressure drop across the particulate separation system is less than 0.5 psi as measured using a flow of 230 CFM of air or $N_2$ gas.

41. A particulate separation system according to any preceding clause, wherein a pressure drop across the particulate separation system is less than 0.3 psi as measured using a flow of 230 CFM of air or $N_2$ gas.

42. A particulate separation system according to any preceding clause, wherein the plurality of cyclonic separators comprises greater than 15 cyclonic separators.

43. A particulate separation system according to any preceding clause, wherein the plurality of cyclonic separators comprises greater than 20 cyclonic separators.

44. A method of removing particles from a particle-laden gaseous stream, comprising: flowing the particle-laden gaseous stream into a particulate separation system according to any preceding clause; separating, using a first array of cyclonic separators fluidly coupled to the first inlet manifold, at least some particles from the first volume of the particle-laden gaseous stream to produce a first volume of a reduced-particle gaseous stream; separating, using a second array of cyclonic separators fluidly coupled to the second inlet manifold, at least some particles from the second volume of the particle-laden gaseous stream to produce a second volume of the reduced-particle gaseous stream; delivering the first volume of the reduced-particle gaseous stream into a first exhaust manifold coupled to the first array of cyclonic separators; delivering the second volume of the reduced-particle gaseous stream into a second exhaust manifold coupled to the second array of cyclonic separators; removing the reduced-particle gaseous stream from the particulate separation system through a fluid outlet coupled to the first exhaust manifold and the second exhaust manifold.

45. A method according to any preceding clause, further comprising: collecting the at least some particles separated from the first volume of the particle-laden gaseous stream in a first collection container fluidly coupled to the first array of cyclonic separators; and collecting the at least some particles separated from the second volume of the particle-laden gaseous stream in a second collection container fluidly coupled to the second array of cyclonic separators.

46. A method according to any preceding clause, wherein each of the plurality of cyclonic separators receives an equal volume of the gaseous stream.

47. A method according to any preceding clause, wherein the first array of cyclonic separators and the second array of cyclonic separators are arranged in parallel.

48. A method according to any preceding clause, wherein a pressure drop across the particulate separation system is less than 0.5 psi as measured using a flow of 230 CFM of air or $N_2$ gas.

49. A method according to any preceding clause, wherein a pressure drop across the particulate separation system is less than 0.3 psi as measured using a flow of 230 CFM of air or $N_2$ gas.

50. A method according to any preceding clause, wherein the plurality of cyclonic separators comprises greater than 15 cyclonic separators.

51. A method according to any preceding clause, wherein the plurality of cyclonic separators comprises greater than 20 cyclonic separators.

52. A method of collecting particles from a particle-laden gaseous stream, comprising: directing a gas stream through a particulate conveyor downstream from a particulate separation system according to any preceding clause further comprising a collection container; a first valve coupled to the collection container; a conduit fluidly coupled to the collection container via the first valve; and a second valve coupling the conduit to the particulate conveyor; closing the first and second valves to fluidly isolate the conduit from the collection container and the particulate conveyor; directing the particle-laden gaseous stream into the plurality of cyclonic separators through the fluid inlet and the inlet manifold; separating at least some particles from the particle-laden gaseous stream to produce a reduced particle gaseous stream; directing at least some particles to the collection container; and opening the first valve to enable the at least some particles in the collection container to flow into the conduit.

53. A method according to any preceding clause, further comprising: closing the first valve to fluidly isolate the collection container from the conduit; and opening the second valve to enable the at least some particles in the conduit to enter the gas stream of the particulate conveyor; wherein the closing of the first valve and the opening of the second valve occurs during the directing of the particle-laden gaseous stream into the plurality of cyclonic separators.

54. A method according to any preceding clause, further comprising: closing the second valve to fluidly isolate the conduit from the particulate conveyor; and opening the first valve to enable the at least some particles in the collection container to flow into the conduit; wherein the closing of the second valve and the opening of the first valve occurs during the directing of the particle-laden gaseous stream into the plurality of cyclonic separators.

55. A method according to any preceding clause, wherein at least one of the first valve and the second valve is closed during the directing the particle-laden gaseous stream into the plurality of cyclonic separators.

56. A method according to any preceding clause, wherein the directing the particle-laden gaseous stream into the plurality of cyclonic separators comprises operating a blower in fluid communication with the particulate separation system, and wherein a pressure drop over the particulate separation system is less than about 20% of a maximum pressure drop tolerated by the blower as measured using a flow of 230 CFM of air or $N_2$ gas.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

The invention claimed is:

1. An additive manufacturing apparatus comprising:

a process chamber surrounding a print head, a recoat head, and a linear motion stage to which the print head and the recoat head are coupled, wherein the print head and recoat head operate within the process chamber to build a three-dimensional object by depositing a build material and a binder material;

a condenser system including a condenser path, a condenser positioned along the condenser path, and a bypass path, the condenser system fluidly coupled to the process chamber to receive a gas stream with a first vapor content from the process chamber and provide the gas stream with a second vapor content to the process chamber, wherein the second vapor content is less than the first vapor content, wherein the gas stream flows along a flow path extending from the process chamber and back to the process chamber;

a blower fluidly coupled to the process chamber and the condenser system to flow the gas stream through a closed loop comprising the blower, the process chamber, and the condenser system;

a first plurality of sensors positioned within the process chamber, wherein the first plurality of sensors comprises a humidity sensor; and a valve operable to bypass the condenser path while maintaining a flow of the gas stream along the bypass path when a humidity of the gas stream detected by the humidity sensor of the first plurality of sensors is less than or equal to a threshold value.

2. The additive manufacturing apparatus according to claim 1, further comprising:

a concentrator fluidly coupled to the condenser system and the process chamber.

3. The additive manufacturing apparatus according to claim 1, further comprising:

a volatile organic compound (VOC) sensor along the flow path of the gas stream through the closed loop.

4. The additive manufacturing apparatus according to claim 1, further comprising:

a lower explosive limit (LEL) sensor along the flow path of the gas stream through the closed loop.

5. The additive manufacturing apparatus according to claim 1, further comprising:

a particle separation system positioned within the closed loop to receive the gas stream from the process chamber and provide the gas stream to the blower, wherein the particle separation system is configured to remove particles from the gas stream.

6. The additive manufacturing apparatus according to claim 5, wherein the particle separation system comprises a plurality of cyclonic separators arranged in a plurality of arrays.

7. The additive manufacturing apparatus according to claim 6, wherein the plurality of cyclonic separators comprises greater than or equal to 12 cyclonic separators.

8. The additive manufacturing apparatus according to claim 5, wherein a pressure drop over the particle separation system is less than about 1.5 psi as measured using a flow of 230 CFM of air or $N_2$ gas.

9. An additive manufacturing apparatus comprising:

a process chamber surrounding a print head, a recoat head, and a linear motion stage to which the print head and the recoat head are coupled, wherein the print head and recoat head operate within the process chamber to build a three-dimensional object by depositing a build material and a binder material;

a first plurality of sensors positioned within the process chamber, wherein the first plurality of sensors comprises at least a temperature sensor, a humidity sensor, and a pressure sensor;

a particle separation system fluidly coupled to the process chamber to receive a particle-laden stream from the process chamber, wherein the particle separation system separates at least some particles out from the particle-laden stream to produce a reduced-particle stream;

a filter fluidly coupled to the particle separation system to receive the reduced-particle stream from the particle separation system, wherein the filter removes additional particles from the reduced-particle stream to provide a clean gas stream, wherein the clean gas stream flows along a fluid recirculation path extending from the process chamber and back to the process chamber;

a blower receiving the clean gas stream;

a temperature control unit for cooling the clean gas stream;

a condenser system including a condenser path, a condenser positioned along the condenser path, and a bypass path;

a second plurality of sensors positioned external to the process chamber and after the particle separation system, the filter, the blower, the temperature control unit, and the condenser system and before the process chamber along the fluid recirculation path, wherein the second plurality of sensors comprises at least a temperature sensor, a pressure sensor, and one or more of a lower explosive limit (LEL) sensor, a humidity sensor, and a vapor sensor;

and a valve operable to bypass the condenser path while maintaining a flow of the clean gas stream along the bypass path when a humidity of the clean gas stream detected by the humidity sensor of the first plurality of sensors is less than or equal to a threshold value, wherein the process chamber, the particle separation system, the filter, the blower, the condenser system, and the temperature control unit form a closed loop.

10. The additive manufacturing apparatus according to claim 9, wherein the filter is a high efficiency particulate air (HEPA) filter.

11. The additive manufacturing apparatus according to claim 10, further comprising a first valve positioned between the particle separation system and the HEPA filter and a second valve positioned between the HEPA filter and the blower along the fluid recirculation path, wherein closing the first valve and the second valve fluidly isolates the HEPA filter from the closed loop.

12. The additive manufacturing apparatus according to claim 9, wherein the condenser system is positioned after the pump and before the process chamber along the fluid recirculation path.

13. The additive manufacturing apparatus according to claim 9, wherein temperature control unit comprises a heat exchanger, and the condenser system passes the clean gas stream to the heat exchanger.

14. The additive manufacturing apparatus according to claim 9, wherein the clean gas stream comprises an inert gas.

15. The additive manufacturing apparatus according to claim 9, wherein an environment within the process chamber is inert.

16. The additive manufacturing apparatus according to claim 9, wherein the process chamber comprises an inlet diffuser through which the clean gas stream enters the process chamber, wherein the inlet diffuser reduces a flow velocity of the clean gas stream.

* * * * *